United States Patent
Zhao et al.

(10) Patent No.: US 10,706,820 B2
(45) Date of Patent: Jul. 7, 2020

(54) METHODS AND APPARATUS FOR PRODUCING A MULTIMEDIA DISPLAY THAT INCLUDES OLFACTORY STIMULI

(71) Applicant: Massachusetts Institute of Technology, Cambridge, MA (US)

(72) Inventors: Nan Zhao, Cambridge, MA (US);
Joseph Paradiso, Medford, MA (US);
Yoav Reches, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/544,497

(22) Filed: Aug. 19, 2019

(65) Prior Publication Data
US 2020/0058269 A1    Feb. 20, 2020

Related U.S. Application Data

(60) Provisional application No. 62/720,075, filed on Aug. 20, 2018.

(51) Int. Cl.
| G09G 5/12 | (2006.01) |
| H04R 1/02 | (2006.01) |
| H04R 3/00 | (2006.01) |
| G06F 3/0484 | (2013.01) |

(52) U.S. Cl.
CPC .............. *G09G 5/12* (2013.01); *H04R 1/025* (2013.01); *H04R 3/00* (2013.01); *G06F 3/04847* (2013.01);

(Continued)

(58) Field of Classification Search
CPC .. G09G 5/12; G09G 2354/00; G06F 3/04847; H04R 1/025; H04R 3/00; H04R 2499/15
See application file for complete search history.

(56) References Cited

U.S. PATENT DOCUMENTS

| 5,724,256 A | 3/1998 | Lee et al. |
| 6,169,595 B1 | 1/2001 | Manne |

(Continued)

OTHER PUBLICATIONS

Herrera, N., et al., Development of a Simple and Low-Cost Olfactory Display for Immersive Media Experiences; published in Proceedings of the 2nd ACM International Workshop on Immersive Media Experiences pp. 1-6, ACM New York, NY, USA, Nov. 2014.

(Continued)

*Primary Examiner* — Michael Pervan
(74) *Attorney, Agent, or Firm* — Stephen R. Otis

(57) ABSTRACT

A system may produce a multimedia presentation that includes visual stimuli, auditory stimuli, olfactory stimuli, thermal stimuli and air currents that are perceptible to a human user. All or part of the system may be housed in or affixed to a table or desk. Sensors may monitor physiology or activities of the user and provide feedback regarding the user's response to the presentation. A user may input instructions for the system. Based on these instructions, the system may present a multimedia presentation which tends to produce a target physiological state of the user that is specified in the instructions or which tends to maintain a current physiological state of the user. The system may employ a control space to control the presentation. This control space may have axes that correspond to how a user perceives multimedia presentations.

20 Claims, 16 Drawing Sheets

(52) U.S. Cl.
CPC ..... *G09G 2354/00* (2013.01); *H04R 2499/15* (2013.01)

(56) References Cited

U.S. PATENT DOCUMENTS

| | | | |
|---|---|---|---|
| 6,386,985 B1* | 5/2002 | Rackham | A63J 1/00 472/75 |
| 6,556,272 B1 | 4/2003 | Du et al. | |
| 6,654,664 B1 | 11/2003 | Chiao | |
| 6,702,767 B1* | 3/2004 | Douglas | A61M 21/0094 600/21 |
| 9,741,169 B1* | 8/2017 | Holz | G06F 3/011 |
| 2003/0206834 A1 | 11/2003 | Chiao et al. | |
| 2006/0251541 A1 | 11/2006 | Santandrea | |
| 2013/0017870 A1* | 1/2013 | Parker | G06Q 30/02 463/1 |
| 2013/0166042 A1 | 6/2013 | Sharma et al. | |
| 2015/0067708 A1 | 3/2015 | Jensen et al. | |
| 2016/0184634 A1* | 6/2016 | Yanev | A63B 21/0442 482/8 |
| 2016/0220163 A1* | 8/2016 | Yamada | G16H 50/20 |
| 2017/0257925 A1* | 9/2017 | Forbis | F21V 3/00 |
| 2018/0008855 A1* | 1/2018 | Yanev | A63B 24/0062 |
| 2018/0064991 A1* | 3/2018 | Yanev | A63B 24/0062 |
| 2018/0190024 A1* | 7/2018 | Dugan | G06K 9/00671 |
| 2020/0064905 A1* | 2/2020 | McIntosh | G06F 3/011 |

OTHER PUBLICATIONS

Kaye, J., Smell as Media; published Aug. 2007 or earlier; accessed on Sep. 19, 2019 at http://alumni.media.mit.edu/~jofish/writing/smellasmedia35.pdf.

Matsukura, H., et al., Smelling Screen: Development and Evaluation of an Olfactory Display System for Presenting a Virtual Odor Source; published in IEEE Transactions on Visualization and Computer Graphics, vol. 19, Issue 4, pp. 606-615; Apr. 2013.

Murray, N., et al., Olfaction-Enhanced Multimedia: A Survey of Application Domains, Displays, and Research Challenges; published in ACM Computing Surveys (CSUR) Surveys, vol. 48 Issue 4, Article No. 56, ACM New York, NY, USA, May 2016.

Nakamoto, T., et al., Multicomponent Olfactory Display Using Solenoid Valves and SAW Atomizer and its Blending-Evaluation; published in IEEE Sensors Journal, vol. 18, Issue 13, p. 5213-5218, Date of Publication May 10, 2018.

Pornpanomchai, C., et al., SUBSMELL: Multimedia with a Simple Olfactory Display; published in Pacific-Rim Symposium on Image and Video Technology (PSIVT 2009); Advances in Image and Video Technology pp. 462-472, year 2009.

Robertson, A., Smellovision masks are here, and they're basically instruments of torture; published in The Verge, Mar. 2015.

Vastenburg, M., et al., A user experience-based approach to home atmosphere control; published in Universal Access in the Information Society, vol. 6, Issue 1, pp. 1-13, Jun. 2007.

Zhao, N., et al., A Multidimensional Continuous Contextual Lighting Control System Using Google Glass; published in Proceedings of the 2nd ACM International Conference on Embedded Systems for Energy-Efficient Built Environments pp. 235-244, Nov. 2015.

Zhao, N., et al., Mediated Atmospheres: A Multimodal Mediated Work Environment; published in Proceedings of the ACM on Interactive, Mobile, Wearable and Ubiquitous Technologies, vol. 1, Issue 2, Article No. 31, ACM New York, NY, USA, Jun. 2017.

Zhao, N., Mediated Atmospheres: Context-Aware Adaptive Lighting and Multimodal Media Environments; MIT PhD thesis, published Mar. 2018.

* cited by examiner

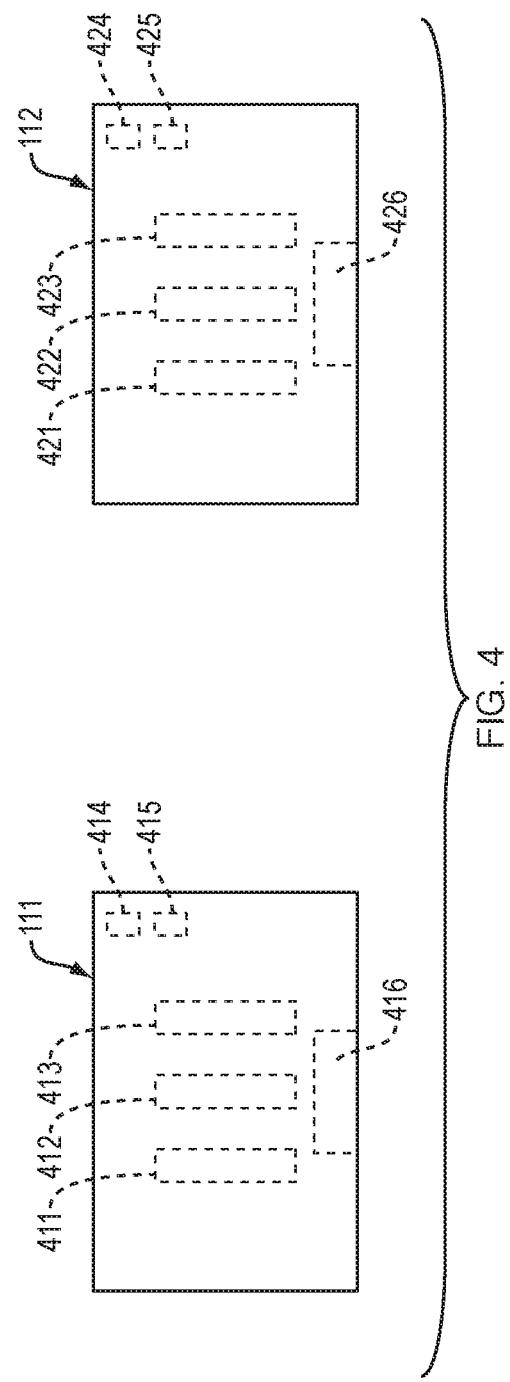

METHODS AND APPARATUS FOR PRODUCING A MULTIMEDIA DISPLAY THAT INCLUDES OLFACTORY STIMULI

RELATED APPLICATIONS

This application claims the benefit of United States Provisional Application No. 62/720,075 filed Aug. 20, 2019 (the "Provisional").

FIELD OF TECHNOLOGY

The present invention relates generally to multimedia displays.

COMPUTER PROGRAM LISTING

The following two computer program files are incorporated by reference herein: (1) GoalSetting_py.txt with a size of about 14 KB; and (2) SignalProcessingServe_py.txt with a size of about 16 KB. Both of these files were created as an ASCII .txt file on Aug. 15, 2019.

SUMMARY

In illustrative implementations of this invention, a system produces a multimedia display that includes visual stimuli, auditory stimuli, olfactory stimuli, thermal stimuli and air currents that are perceptible to a human user. All or part of the system may be housed in or affixed to a table or desk. A user who is seated at the table or desk may perceive the display. Sensors may monitor activities and physiology of the user and provide feedback regarding the user's response to the display. A user may input instructions for the system. Based on these instructions, the system may present a multimedia display which tends to produce a target physiological state of the user that is specified in the instructions or which tends to maintain a current physiological state of the user. The system may employ a control space to control the multimedia display. This control space may have axes that correspond to how a user perceives multimedia displays.

In illustrative implementations, the system dynamically changes a multimedia display to enhance a user's work experience through multimodal control of light, sound, images, airflow, heat, and scent. The system may perform continuous bio-signal monitoring and thereby receive real-time feedback. Base on the feedback, the system may in real-time change the multimedia display according to the user's activity and physiological responses to the ambient stimuli.

This ability to dynamically adjust a multimedia display is highly advantageous. The sensorial qualities of a space—what we sometimes call the "atmosphere"—may be a combination of light, sound, scent, thermal effects, and air currents and may have a strong influence on a user's experiences and behavior. Dynamically manipulating this "atmosphere" may affect a user's cognitive performance, mood and physiology.

In some implementations of this invention, the system revises a multimedia display in a closed-loop fashion, based on sensor feedback regarding a user's activities, physiological state or affect. The system may employ personalized user response models for accurate control.

In some implementations of this invention, the system may adjust a multimedia display in a manner that responds to changing user needs. For instance, when the user wants to focus on a task, the system may output a display that facilitates focusing. Likewise, when the user wants to relax, the system may output a display that facilitates relaxing. For example, the system may produce a display that adaptively changes from suggesting a library (conducive to focusing) to suggesting a forest (conducive to relaxing). The multimedia display may suggest the invigorating tension of a control room or the restorative qualities of a beloved childhood hideaway. In some cases, the multimedia display may strengthen a user's memory or support learning by the user.

In some implementations of this invention, closed loop control of a multimedia system is achieved with a control space that includes at least two control axes. In each control axis, a coordinate on the axis may indicate a degree to which a multimedia scene facilitates or is perceived to facilitate a user state or a degree to which the user state is achieved. For example, the two control axes may be focus and restoration. A user may provide input that specifies a target state. The target state may be different than, or the same as, the user's current state. The system may select a scene that has coordinates, in the control space, that are closest, by at least a threshold, to the target state, and present the scene to the user. Sensors in the system may measure a user state that results from presenting the scene. The system may revise the scene's coordinates accordingly.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIG. 4 shows scent dispensers.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

In illustrative implementations of this invention, a system outputs multiple multimedia displays that include visual stimuli, auditory stimuli, olfactory stimuli, thermal stimuli and air currents. The system outputs different multimedia displays (which we sometimes call "scenes") at different times. These scenes may create the feeling of familiar environments, such as a lush forest or warm sunset. These scenes may also elicit responses from the user, such as relaxation, creativity, or focus.

Each scene may include (in addition to other types of stimuli) video and accompanying sound. The lighting for a scene may match the ambiance of the location shown in the video for the scene. Parameters of lighting (such as intensity, color, contrast, and direction of lighting) may be altered to create visual effects. Scent that is presented to the user during a scene may be related to the location of the scene (e.g., forest or beach), to details (color or objects) in the scene, or to the scene's overall effect on a user (e.g., relaxation or focus). The scent may be presented to the user at the same time as the scene, and then may disappear slowly over time. More scent may be released in response to the user's activity and physiological signals. A target thermal condition may match the location of the scene or the theme of the scene. Thermal stimuli for a scene may be presented to the user at the beginning of the scene or at intervals during the scene.

Figure 1:
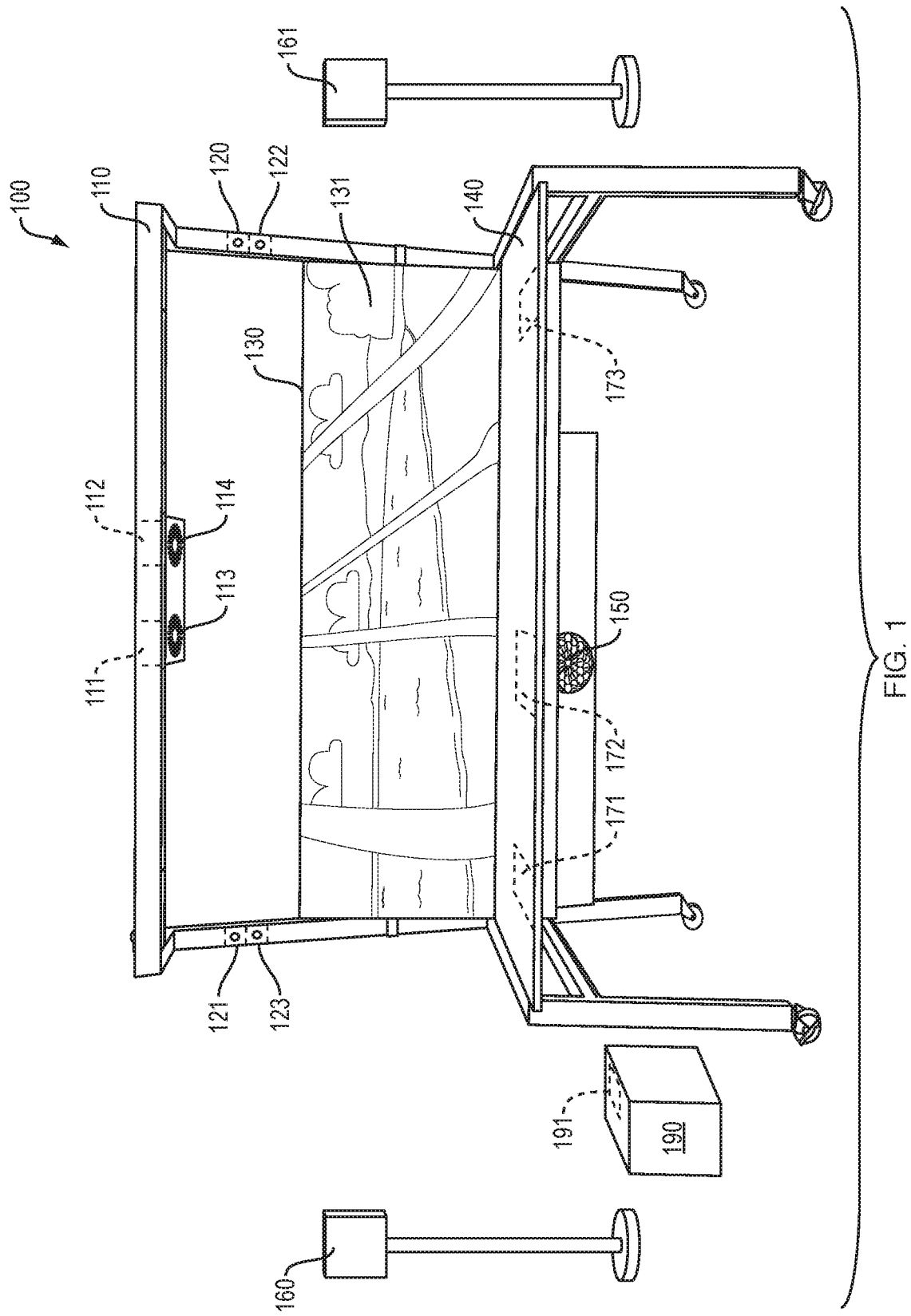
FIGS. 1, 2 and 3 show a perspective view, front view, and side view, respectively, of a system for producing a multimedia display.
Figure 3:
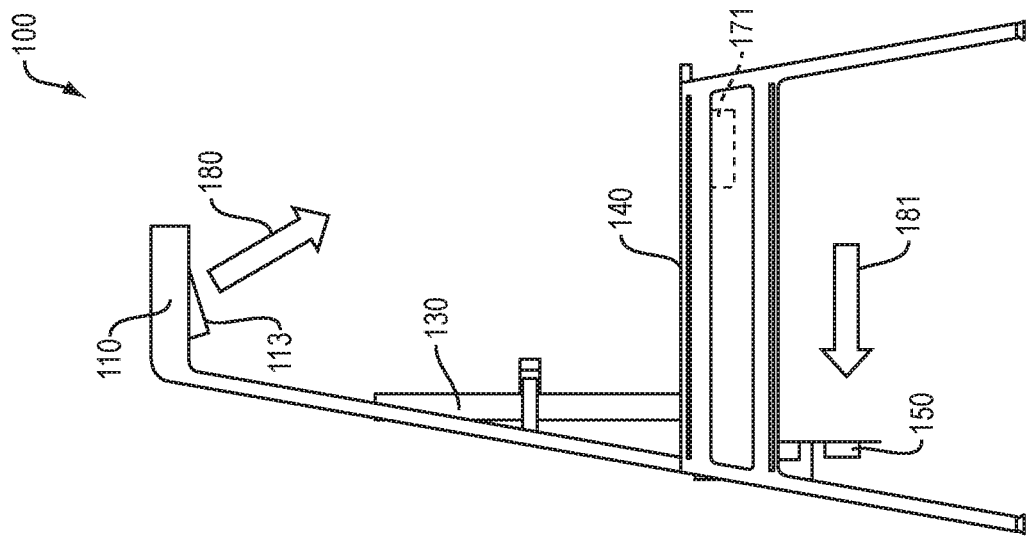
Figure 2:
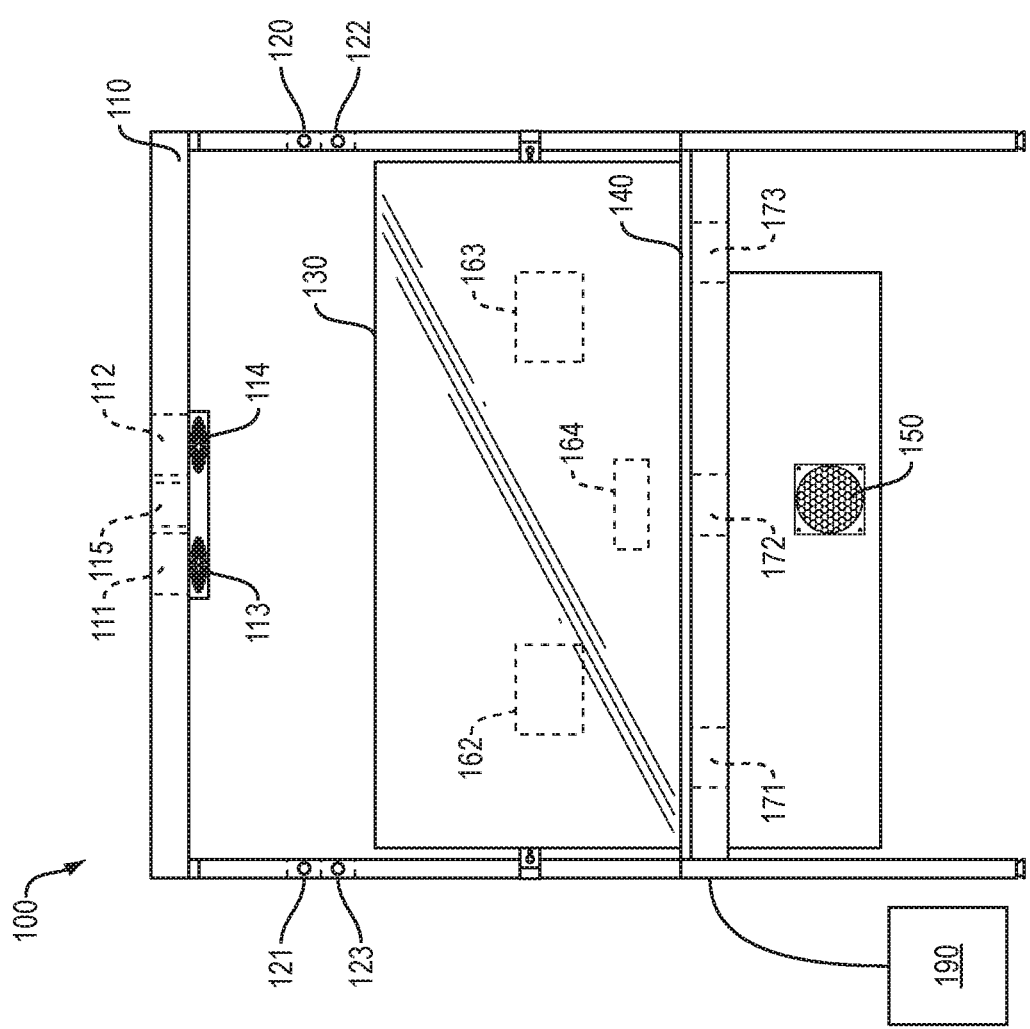

FIGS. 1, 2 and 3 show a perspective view, front view, and side view, respectively, of a system configured: (a) to produce a multimedia display; (b) to take sensor measurements regarding a human user; and (c) to perform closed loop control of the display based on feedback from sensors.

In the example shown in FIGS. 1, 2 and 3, a system 100 includes: (a) a table 140; (b) multimedia hardware that outputs video, audio, room lighting, scent, thermal effects, and air movement; (c) sensors; and (d) one or more computers.

Figure 5:
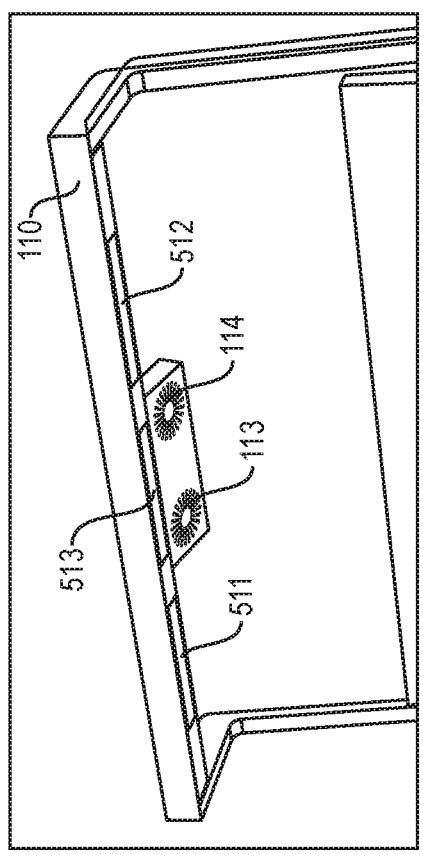
FIG. 5 shows downlights and fans mounted on a beam.
Figure 6:
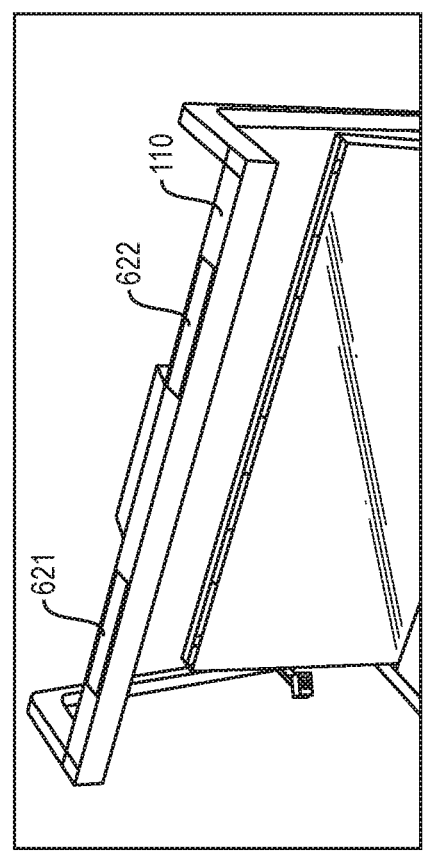
FIG. 6 shows wall-washer lights mounted on a beam.

In FIGS. 1, 2 and 3, the multimedia hardware comprises: (a) an electronic display screen 130 that displays a video 131; (b) audio speakers 160, 161, 162, 163; (c) luminaires 511, 512, 513, 621, 622; (d) scent dispensers 111, 112; (e) electric fans 113, 114, 150; and (e) thermal devices 171, 172, 173. (The luminaires are not shown in FIGS. 1, 2 and 3, but are shown in FIGS. 5 and 6.)

Alternatively, headphones or wearable speakers may deliver sound to the user. For instance, wireless headphones or wireless wearable speakers may be employed to deliver sound to the user. Alternatively, table 140 may be replaced by a desk.

Electronic display screen 130 may be positioned in such a way that a flat surface of the display screen is vertical and is thus perpendicular to a flat horizontal surface of table 140. Electronic display screen 130 may include a mounting frame, an emitter array, and a diffuser. The diffuser may create a diffused image, thereby creating an ambient feeling that distinguishes the visual experience from a conventional television or monitor display. Ambient light may pass through the diffuser and penetrate the image, thereby creating a unified visual effect. The diffuser may appear as a warm white surface when electronic display screen 130 is not actively displaying an image.

Scent dispensers 111, 112 may dispense scent into air and then fans 113, 114 may blow the scented air toward a human user who is sitting at (e.g., in front of) table 140. Fan 150 may pull air away from the user, or alternatively, blow air toward the user. After fans 113, 114 blow scented air toward a user, fan 150 may cause (or help cause) the scented air to disperse and move away from the user. Likewise, fans 113, 114 may at times reverse direction and blow air in such a way as to pull scented air away from a human user who is sitting in front of table 140. Fans 113, 114: (a) may blow air in direction 180 toward a user who is sitting in front of table 140; or (b) may blow air in an opposite direction away from the user. Fan 150: (a) may blow air in direction 181 away from a user who is sitting in front of table 140; or (b) may blow air in an opposite direction toward the user. Each scent dispensed by a scent dispenser may itself comprise a mixture of scents and may itself comprise multiple olfactory stimuli.

In some use scenarios, fans 113, 114, 150 produce air currents that are sufficiently rapid to be perceptible to a human user. The air currents may be employed to cause a human user to experience a sensation of wind, as part of a multimedia experience. Alternatively, fans 113, 114, 150 may produce gentle air currents that are so slow that a human user tends to ignore or be unaware of the air currents. Air that is blown by the fans may be scented or unscented. Furthermore, air that is blown by the fans may be heated by thermal devices 171, 172, 173, cooled by thermal devices 171, 172, 173; or neither heated nor cooled by the thermal devices.

Thermal devices 171, 172, 173 may comprise heaters or cooling devices that heat or cool a human user or that heat or cool air that is blown toward a human user. For instance, thermal devices 171, 172, 173 may comprise heaters that warm the user by radiated energy (e.g., by emitting infrared light). In some cases, thermal devices 171, 172, 173 comprise electric infrared heaters that include a filament that emits infrared light. For instance, the filament may be a wire that comprises tungsten, or carbon, or an alloy that includes iron, chromium or aluminum. Alternatively, thermal devices 171, 172, 173 may comprise resistive heaters that heat air. Fans may blow the heated air toward a human user and heat the user by convection. Thermal devices 171, 172, 173 may each comprise a micro-cooler or cooling element that cools air. Fans may blow the cooled air toward a human user. For instance, thermal devices 171, 172, 173 may comprise evaporative coolers that cool air by evaporative cooling. Alternatively, thermal devices 171, 172, 173 may cool air by vapor-compression cycles. In some cases, thermal devices 171, 172, 173 comprise Peltier devices that cool or heat by thermoelectric cooling or thermoelectric heating.

In FIGS. 1, 2 and 3, the system includes sensors that capture images of, or take measurements of, a human user. For instance, the sensors may take measurements of physiological states of a user or take measurements of activity or motion of the user. Video cameras 120, 121 may capture videos (in the visual light range) of the human user. Facial feature tracking may track facial features from the videos.

Posture, head pose, gaze direction, facial expression, facial affect, and motion of a human user may be determined based on visible light images of the user that are captured by video cameras 120, 121 (or based on tracked facial features that are extracted from these images). Infrared video cameras 122, 123 may capture infrared images (in the infrared range) of the human user. For instance, skin temperature of a user may be determined, based on infrared images captured by infrared video cameras 122, 123. The detected skin temperature may be indicative of affect and attention. For instance, a colder nose and warmer forehead may indicate a heavy cognitive load. Facial temperatures may indicate a wide range of emotions, including fear. Microphone 164 may record speech of a human user. Based on audio recordings by microphone 164, one or more computers (e.g., 190, 1003) may recognize a user's affect (based on tone of voice) or may recognize verbal instructions spoken by the user. The system may include other sensors (such as sensors worn by the user) that measure physiological states of the user, such as heart rate, heart rate variability, respiration rate, or EEG (electroencephalography) signals.

FIG. 4 shows scent dispensers. In the example shown in FIG. 4: (a) scent dispenser 111 includes three containers (or cartridges) 411, 412, 413 that store three different scents; and (b) scent dispenser 112 includes three other containers (or cartridges) 421, 422, 423 that store three other scents. For ease of illustration, each scent dispenser in FIG. 4 contains three scent containers. In practice, the number of scents stored by each scent dispenser may be larger than three. For instance, in some cases, the number of different scents stored by each scent dispenser (and the number of scent containers in each scent dispenser) is: (a) four; (b); five; (c) six; (d) seven; (e) eight; (f) nine; (g) ten; (h) greater than or equal to 11 and less than or equal to 20; (i) greater than or equal to 21 and less than or equal to 100; or (j) more than 100. In some cases, a scent dispenser mixes two or more different scents (that are stored by the scent dispenser) to create another scent. Mechanisms 416, 426 are each configured to facilitate or cause the dispersion of scent into air. For instance, mechanisms 416, 426 may each include a nebulizer or atomizer. The nebulizer (or atomizer) may employ ultrasound, electrostatics, centrifugal force, or compressed gas to break up scented liquid into tiny droplets. Mechanisms 416, 426 may include an atomizer nozzle. The atomizer nozzle may break up a scented liquid into tiny droplets by moving an air current across a top end of a vertical tube that contains the scented liquid, thereby creating lower air pressure at the top of the vertical tube. Alternatively, or in addition, mechanisms 416, 426 may include one or more heaters. The one or more heaters may heat a scented material: (a) to make the scented material more volatile; or (b) to cause all or a portion of the scented material to evaporate or sublimate into air. Microprocessors 415 and 425 may control scent dispensers 111 and 112, respectively, and may in turn be controlled by one or more computers (e.g., 190, 1003).

One or more computers (e.g., 190, 1003) may output instructions that control the scent dispensers. For instance, the instructions may specify: (a) type of a scent to be dispensed; (b) strength (e.g., quantity or concentration) of scent to be dispensed; and (c) when to dispense the scent. For instance, the scent for a scene may be dispensed at the beginning of the scene or at intervals during the scene. The scent dispensers may be controlled in such a way as to take into account a time lag between when the scent dispenser releases a scent and when the scent physically reaches a user. One or more computers (e.g., 190, 1003) may cause a scent dispenser to release scent into the air and cause fans to blow the scented air toward a user, in such a way that the scented air reaches the user a short time later while the user is experiencing audiovisual content that is associated (by the one or more computers) with the scent. The one or more computers (e.g., 190, 1003) may communicate with scent dispensers (e.g., 111, 112) wirelessly or via a wired connection. For instance, microcontrollers 415 and 425 may be housed in the scent dispensers and may communicate with one or more computers (e.g., 190, 1003) via wireless modules 414 and 424, respectively. One or more computers (e.g., 190, 1003) may control electric fans (e.g., 113, 114) to cause the fans to blow scented air toward or away from the human user.

In some cases: (a) the multimedia system presents a scene; and (b) a scent dispenser (e.g., 111 or 112) dispenses a scent that would typically occur in the scene. For instance, during a "beach" scene, a scent dispenser may output a scent that smells like salt water, fresh water, or vegetation.

In some other cases: (a) the multimedia system presents a scene; and (b) a scent dispenser (e.g. 111, 112) dispenses a scent that does not typically occur in the scene. For instance, a scent dispenser may dispense a lavender scent (to relax the user) during a "beach" scene.

A scent presented to a user during a scene may produce an emotional response in the user (e.g., the same emotional response as is produced by the remainder of the scene). For instance, a coffee scent or peppermint scent may have a stimulating effect on a user. Likewise, a lavender scent may have a relaxing effect.

The multimedia hardware may output different scenes. For instance, each scene may be a unique combination of visual stimuli, audio stimuli, room lighting, and olfactory stimuli (and optionally thermal stimuli, air movement or haptic stimuli).

Different scents may be presented to a human user during different scenes. For instance, while a system outputs a multimedia "library" scene, a scent dispenser may dispense peppermint scent (to help a user focus), or coffee scent, or smell of books. Also, while a system outputs a multimedia "sunrise" scene or "beach" scene, a scent dispenser may dispense a salt water scent, a freshwater scent, a vegetation scent, or a lavender (relaxing) scent. While a system outputs a "Christmas" scene, a scent dispenser may dispense a cinnamon scent, paraffin scent (evocative of fire in a fireplace) or a lavender (relaxing) scent. In some cases, while a system outputs a "neutral" scene, the scent dispensers do not dispense scent.

Likewise, different thermal stimuli may be presented to a human user during different scenes. For instance, while a system outputs a "beach" scene, infrared heaters may heat a user. Alternatively, while a system outputs an "early morning mist" scene, a cooling device (e.g., an evaporative cooler) may output a cool mist.

FIGS. 5 and 6 show luminaries that illuminate table 140 or its environment (e.g., a room in which the table is located). In FIGS. 5 and 6, downlights 511, 512, 513 and "wall-washer" lights 621, 622 are mounted on structural beam 110. Structural beam 110 is attached to, and is positioned above, table 140. Downlights 511, 512, 513 provide direct illumination for objects (such as table 140) that are located beneath the downlights. "Wall-washer" lights 621, 622 illuminate a wall and ceiling that are above the wall-washer lights, and thereby provide indirect, ambient illumination for table 140 and the room in which it is located. Each of these downlights and wall-washer lights may itself comprise an array of multiple luminaires. For instance, each downlight and wall-washer light may comprise an array of LED (light-emitting diode) light sources that: (a) is configured in such a way that the intensity, color and color temperature of light emitted by the array may be dynamically adjusted and controlled in real-time; and (b) may include one or more diffusers and color filters.

In some cases, the luminaires (e.g., downlights and wall-washer lights) are each an individually controllable five-channel (red, green, blue, warm white, and cold white) colored LED fixture. These individually controllable light fixtures may be mounted on or housed in a support structure that is in the shape of a beam (e.g., 110). Structural beam 110 may on top of the table surface and may be affixed to and supported by the table. The wall-washer lights 621, 622 may be pointed upward to a ceiling creating a diffused, indirect lighting effect. The downlights 511, 512, 513 may be pointed downward toward the table surface creating direct spotlights.

Figure 7:
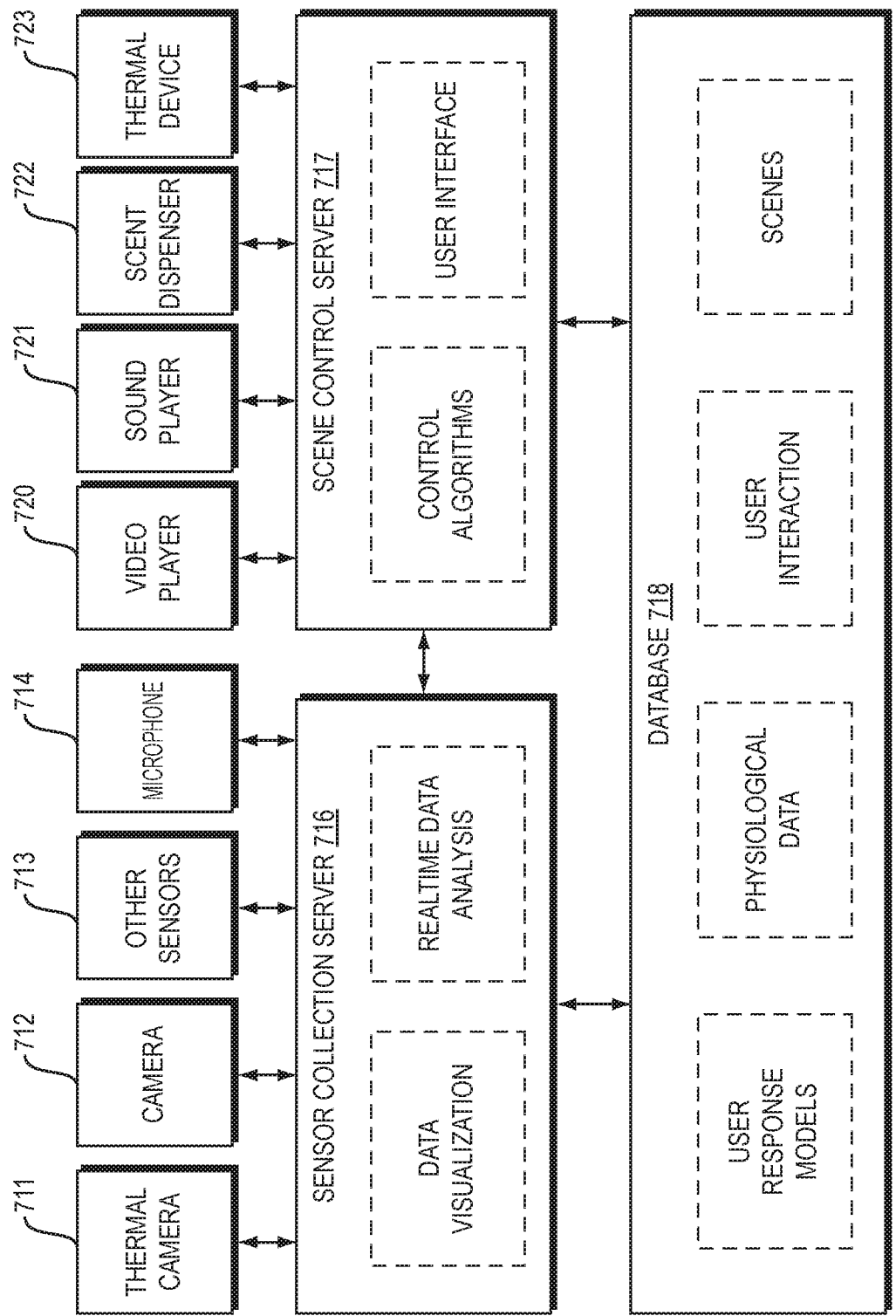
FIG. 7 is a block diagram that illustrates sensor and display functionality of a multimedia system.

FIG. 7 is a block diagram that illustrates sensor and display functionality of a multimedia system.

In the example shown in FIG. 7, a sensor collection server 716: (a) accepts data that represents measurements taken by a set of sensors; and (b) performs data visualization and real-time data analysis. In FIG. 7, the set of sensors includes a thermal (e.g., infrared) camera 711, a video camera 712, a microphone 714 and other sensors 713.

In FIG. 7, the other sensors 713 may comprise one or more wearable sensors, including sensors mounted on a chest strap, sensors mounted on a wrist band, and an EEG headband. These sensors 713 may monitor a user's physiological state. These sensors 713 may include a chest strap (e.g., breathing, motion), two visible light cameras, and thermal cameras in combination with existing facial feature tracking algorithms. For instance, the sensors that are mounted on a chest strap may measure heart rate, heart RR interval, respiration rate, breathing waveform, posture, activity level, peak acceleration and 3-axis acceleration The sensors mounted on the wrist band may measure 3-axis acceleration, blood volume pulse inter-beat interval, electrodermal activity and skin temperature. The EEG headband may include one or more sensors that measure EEG signals. For instance: (a) the EEG sensor make take measurements; and (b) a computer may—based on these measurements—calculate EEG alpha theta band entropy and EEG gamma beta band entropy.

In FIG. 7, a scene control server 717 performs control algorithms that employ sensor feedback to control a multimedia display. Scene control server 717 may control one or more input/output devices in order to create a user interface (e.g., a graphical user interface). Scene control server 717 may cause a multimedia scene to be presented to a user, by controlling a video player 720, sound player 721, scent dispenser 722 and thermal device 723.

In FIG. 7, the software for sensor collection server 716, scene control server 717 and database 718 may be executed by one or more computers (e.g., 190, 1003). Likewise, data in database 718 may be stored in one or more computers (e.g., 190, 1003) or memory devices (e.g., 1005).

In some implementations of this invention, a multimedia system includes a desk and dynamically changes ambient conditions, such as lighting, images, airflow, and scent. These changes may help users to feel better about their environment and improve their well-being and productivity at work. Hardware in the system (e.g., hardware that outputs audio, visual, olfactory, thermal and wind stimuli) may be integrated with the desk. The system may also include hardware (e.g., heart rate monitor and camera) that performs real-time sensing to monitor the user's response. The system may personalize the ambient output to the user's physiological response and intended goal.

In some implementations of this invention, the system is housed in and on a desk and is mobile and modular. In some cases, mobility and modularity allow the system to be configured in an open space, as paired workstations, and work neighborhoods.

The multimedia system which is housed in or on a desk (hereinafter, "multimedia desk") may provide a multimodal output that transforms a user's experience of his or her workspace using lighting, video display, olfactory display, thermal and airflow control, and sound display. The multimedia desk may function alone or in synchronicity with other desks. The multimedia desk may sense a user's response using sensor fusion of various bio-signal sensors (e.g., heart rate monitor, thermal imaging, and face tracking). The scenes may be driven from real-time data and streams of data or media from real environments.

Alternatively, a table may be employed, instead of a desk.

In some implementations of this invention, a multimedia system comprises: (a) one or more luminaires; (b) a projector or an electronic visual display screen; (c) one or more speakers; (d) one or more scent dispensers; (e) one or more heaters or cooling devices; (f) one or more fans; (g) one or more sensors; and (h) one or more computers.

The multimedia system may be controlled with a control space that includes at least two control axes. The control axes may be contextual control axes. For example, the control axes may relate to a context in which the multimedia presentation is being made—such as whether the user is trying to focus on a mentally demanding task or wants to relax. In some implementations, a coordinate on a control axis may indicate: (a) a degree to which a multimedia scene facilitates or is perceived to facilitate a specific user state; or (b) a degree to which the specific user state is achieved.

In some implementations, the coordinates (in a control space) of a multimedia scene are revised based on sensor feedback. This feedback may enable the system to customize its output for each user. For instance, the sensor feedback may enable the system to learn, for each individual user, which multimedia scene is actually closest (for that user) to a target state—and to adjust accordingly which multimedia scene it presents to that user.

In illustrative implementations, a system outputs a multimedia presentation (or scene) that includes video, sound, scent, thermal effects (e.g., heating or cooling), air movement, and room lighting.

In some use scenarios, a multimedia presentation is perceived by a user as a scene that is conducive to focus, or a scene that is perceived by a user as restorative.

For example, the multimedia system may create, in a room, a "forest" scene that is usually perceived by users as both restorative and conducive to focus. The "forest" scene may include: (a) a video of a forest scene with little movement in the video; (b) low room lighting (e.g., 250 lux on a desk at which a user is sitting) with 3500° Kelvin color temperature; (c) a sound track of forest and river noises; and (d) a scent (such as water, pine, or other vegetation).

Or, for example, the multimedia system may create, in a room, a "library" scene that is usually perceived by users as conducive to focus but not restorative. The "library" scene may include: (a) a video of a study room in a library, with little movement in the video; (b) bright room lighting (e.g., 1000 lux on a desk at which a user is sitting) with 5500° Kelvin color temperature; (c) a sound track of library noises (such as flipping pages); and (d) a scent (such as peppermint scent, coffee scent or the scent of books).

Or, for example, the multimedia system may create, in a room, a "kites" scene that is usually perceived by users as restorative but not conducive to focus. The "kites" scene" may include: (a) a video of three kites against a blue sky, with a large amount of movement in the video; (b) medium-bright room lighting (e.g., 800 lux on a desk at which a user is sitting) with 9000° Kelvin color temperature; (c) a sound track of ocean waves crashing against a shore; and (d) a scent (such as salt water, fresh water or vegetation).

Or, for example, the multimedia system may create, in a room, a "city" scene that is usually perceived by users as neither restorative nor conducive to focus. The "city" scene may include: (a) a video of crowds of pedestrians in a city, with a large amount of movement in the video; (b) bright room lighting (e.g., 1000 lux on a desk at which a user is sitting) with 6500° Kelvin color temperature; (c) a sound track of city noises, including sound from streets and from inside stores; and (d) a scent (such as a coffee scent or peppermint scent). A wide variety of other "city" scenes may be generated. Depending on the particular stimuli involved, a "city" scene may be either stimulating or relaxing.

In some implementations, the two control axes are focus and restoration. For a given scene, values along the "focus" axis of the 2D control space may indicate the degree to which users perceive the scene as being conducive to the users' ability to focus. Likewise, for a given scene, values along the "restoration" axis of the 2D control space may indicate the degree to which users perceive the scene as being restorative (e.g., relaxing or casual or associated with a break from work).

In some implementations, the control axes of the control space are derived, or have been previously derived, from a higher dimensional space of observations of scenes outputted by a multimedia system. For example, in some cases, the Restoration and Focus axes of a 2D control space are derived, or have been derived, by PCA (principal component analysis) from a high dimensional set of observations of scenes. For instance, the observations may be of different scenes outputted by the multimedia system. These observations may comprise: (a) user ratings of the scene; or (b) sensor measurements of the scene.

Each scene (i.e., each multimedia presentation) may be assigned values in both dimensions of the control space. For example, in an illustrative use scenario: (a) a 2D control space has two axes, focus and restoration; (b) values on each axis range from −1 to +1; and (c) based on user ratings, a "forest" scene may be assigned a value of (0.25, 0.5), that is, 0.25 on the focus axis and 0.5 on the restoration axis.

Likewise, a specific group of settings for a multimedia system (that result in a specific scene being created) may be assigned a value along each of the control axes, respectively. In some cases, a multimedia system includes many different transducers each with many different outputs, and thus the settings space (of multimedia settings that produce specific scenes) has more dimensions than the two-axis control system.

In some implementations, sensor readings are taken to determine a user's state. For example, these sensor readings may comprise measurements regarding the user's heart rate variability (HRV), head orientation (e.g., head looking up at video screen or down at desk), facial expression, respiration rate, and electrical activity in the brain. Based on these sensor readings, a computer may calculate a focus indicator and a restoration indicator. The focus indicator may indicate the extent to which a user is focusing. The restoration indicator may indicate the extent to which the user is in a casual or relaxed mood.

In some cases, a specific combination of sensor readings that are indicative of a user's state may be associated with a point in the 2D control space. For example, in an illustrative use scenario: (a) a 2D control space has two axes, focus and restoration; (b) values on each axis range from −1 to +1; (c) sensor readings are taken of a user; (d) these sensor readings comprise a specific combination of values of HRV, head orientation, facial expression, respiration rate and brain electrical activity of the user; and (e) this specific combination of sensor readings may be assigned a value of (0.5, −0.2) in the 2D control space, that is, 0.5 along the focus axis and −0.2 along the restoration axis.

In some implementations, the sensor system includes multiple types of sensors, and the sensor space (of sensor readings) has more dimensions than the two-dimensional control space.

In some implementations, open loop control of the multimedia system is performed via a two-dimensional control space. For example, in an implementation with open loop control: (a) a user may select a point in the 2D control space; (b) the multimedia system may determine which stored scene in the system's scene library has coordinates (in the 2D control space) closest to the user-selected point; and (b) the multimedia system may begin to output this closest scene.

Here is a non-limiting example of open loop control, in an illustrative implementation of this invention: (a) a multimedia system has a 2D control space with two control axes; (b) the two control axes are focus and restoration; (c) a user selects point (0.64, 0.45) in the 2D control space, that is, selects 0.64 on the focus axis and 0.45 on the restoration axis; (d) the multimedia system determines which scene, in its stored scene library, has coordinates (in the 2D control space) that are closest to the user-selected point of (0.64, 0.45), and concludes that a stored "poppy" scene (which has coordinates in the 2D control space of (0.756, 0.698)) is the closest scene; and (d) the multimedia system transitions its output to the poppy scene, by fading out the current scene, briefly displaying a neutral scene, and then fading in the poppy scene.

In the preceding example of open loop control, no sensor readings are taken, or if they are taken, they are not a factor in the open loop control.

Thus, the open loop control may, in some cases, fail to adjust for individual differences among users. For instance, in the preceding example: (a) the (0.756, 0.698) coordinates of the poppy scene (in the 2D control space) may be based on average user ratings provided by a large group of users; (b) for the particular user who made the selection, the poppy scene may actually have coordinates of (−0.19, 0.42); (c) for the particular user who made the selection, a "river" scene may actually have coordinates (in the 2D control space) that are closer to user-selected point than the poppy scene is; but (d) the system would continue to output the poppy scene anyway. Thus, in some cases, because open loop control fails to adjust to an individual user's actual response to a scene, open loop control may fail to induce the desired state in the user.

In some implementations, closed loop control of the multimedia system is performed via a two-dimensional control space. Advantageously, the closed loop control may adjust to an individual user's actual response to a scene, and thus may more accurately achieve a user's goal.

In some implementations, closed loop control may be performed in either: (a) "Maintain State" mode; or (b) "Goal" mode.

In some use scenarios, when a user selects "Maintain State" mode, the user is instructing the multimedia system to output scenes which help the user to remain in the user's current state—i.e., which help the user to remain in the user's state as of the time that the user selects "Maintain State" mode.

In some use scenarios, when a user selects "Goal" mode and selects a target user state, the user is instructing the multimedia system to output scenes which help the user to achieve a goal—specifically, to achieve the target user state.

In both modes, the user may, at least implicitly, select a target user state.

In the "Maintain State" mode, the target may be the user's current state—i.e., the user's state when the user selects "Maintain State" mode. In the "Maintain State" mode, the user typically does not explicitly specify the coordinates (in the control space) of the target. This is because, in the "Maintain State" mode: (a) the target may be the user's current state when the mode is selected; (b) sensors may take measurements of the user; (c) based on these measurements, the system may detect this current user state; and (d) the system may associate this current user state with coordinates in the control space.

In contrast, in the "Goal" mode, the user may explicitly select a specific target state. In the "Goal" mode, the target is typically different than the user's current state (when the user specifies the target's coordinates).

In both of these modes of closed loop control, the multimedia system may determine the coordinates (in the control space) of the target state. As noted above, in "Maintain State" mode, the target state may be the user's state as of when the mode is selected, and the coordinates (in the control space) of this target may be automatically determined from sensor readings regarding the user. In the "Goal" mode, the user may explicitly select coordinates (in the control space) of the target state. Or, in "Goal" mode, the user may explicitly select a target state and the system may associate the target with specific coordinates in the control space.

In both of these modes of closed loop control, after the coordinates of the target user state are determined, the system selects the stored scene in the system's scene library that has coordinates (in the 2D control space) that are closer to the coordinates of the target state than those of any other scene in the library; and (c) then begins to output this scene (e.g., by fading out a current scene, briefly displaying a neutral scene, and then fading in this scene that is closest to the user's current state). To prevent instabilities due to frequent changes in scenes, hysteresis may be employed. For example, in some implementations, the system transitions from a first scene to a second scene only if the second scene is closer—by at least a threshold amount—to the target state than is the first scene.

In some implementations, a user who has selected Goal mode may instruct the multimedia system to quickly transition (skip) to a scene that the user thinks is close to the target state, and then to continue with Goal mode.

In some implementations, a user may select either Maintain State mode or Goal mode, and may change this selection at any time. In some cases, in the Goal mode, the user may change or set the target state at any time.

In closed loop control, the coordinates (in the 2D control space) that are assigned by the system to a particular scene may be adjusted based on feedback from sensors. For example, in some implementations, sensors may measure a user state that results from presenting a specific scene. The system may revise the specific scene's coordinates, based on the sensor measurements. If this revision causes the scene's coordinates to move further from the target, then the system may select (and present to the user) a different scene, that is closer, by at least a specified threshold, to the target.

For instance, in the Goal mode, if a specific scene causes a user's state to move in a direction that is not toward the assigned coordinates of the specific scene, then the system may revise the coordinates of the scene. Here is a non-limiting example of revising coordinates of a scene, in the Goal mode: (a) A user whose current state is (0,0) selects a target state that is (0.5, 1); (b) the system displays scene X which has coordinates of (0.5, 0.9), to try to move user's state closer to the target; (c) scene X does not have the expected effect, but instead causes the user's state to change to (−0.2, 0.4); (d) the system revises the coordinates of scene X to (−0.2, 0.4); and (e) the system then displays another scene, whose coordinates are closer—by at least a threshold amount—to the target than are the revised coordinates of Scene X. In this paragraph, all of the coordinates and distances are in a 2D control space.

Likewise, in the Maintain State mode, if a specific scene causes a user's state to move in a direction that is not toward the assigned coordinates of the specific scene, then the system may revise the coordinates of the scene. Here is a non-limiting example of revising coordinates of a scene, in the Maintain State mode: (a) A user whose state is (0,0) selects Maintain State mode; (b) the system displays scene Y which has coordinates of (0.015, 0.120) because the coordinates of scene Y are closer to the user's current state (0,0) than are the coordinates of any other scene in the system's scene library; (c) scene Y does not have the expected effect, but instead causes the user's state to change to (−0.8, 0.6); (d) the system revises the coordinates of scene Y to (−0.8, 0.6); and (e) the system then displays another scene, whose coordinates are closer—by at least a threshold amount—to (0,0) than are the revised coordinates of Scene Y. Recall that, in this example, the state that the user is trying to maintain is (0,0). Again, in this paragraph, all of the coordinates and distances are in a 2D control space.

In some implementations, scene coordinates (in the 2D control space) are initially assigned by the multimedia system based on user ratings from a group of users.

In some cases, coordinates (in the 2D control space) that are assigned to scenes or to particular sets of sensor readings may be customized for individual users.

For a specific user, the coordinates (in the 2D control space) that are assigned to a particular scene may be revised based on sensor readings regarding that user which are taken while the scene is presented to that user (as described above). Or, the coordinates (in the 2D control space) that are assigned to a particular scene may be revised for a specific user based on user ratings (regarding the specific scene) provided by the specific user in response to a survey.

In some implementations, a multimedia system associates a specific scene with specific coordinates in a control space by accessing a database or lookup table that stores an association (e.g., mapping) between the specific scene and the specific coordinates. For instance, the scene may comprise a particular combination of simultaneous video, audio, room lighting, scent, thermal effects and air currents outputted by the multimedia system.

Likewise, in some implementations, a multimedia system associates a specific permutation of settings of multimedia transducers (that result in a specific scene being outputted by the system) with specific coordinates in a control space by accessing a database or lookup table that stores an association (e.g., mapping) between the specific coordinates and the specific permutation of settings of multimedia transducers.

Likewise, in some implementations, a multimedia system associates a specific permutation of sensor readings regarding a user with specific coordinates in a control space by accessing a database or lookup table that stores an association (e.g., mapping) between the specific permutation of sensor readings and the specific coordinates.

Likewise, in some implementations, a multimedia system associates a specific user state with specific coordinates in a control space by accessing a database or lookup table that stores an association (e.g., mapping) between the specific user state and the specific coordinates.

In some implementations, the database or lookup table (which stores associations) is stored in a local memory device inside the system. In other cases, the database or lookup table is stored remotely from the system, and the system accesses the database or lookup table via a network such as the Internet.

In some implementations, all or part of the content of scenes in a scene library is stored in a local memory device inside the system. In other cases, all or part of the content of scenes in a scene library is stored remotely from the system, and the system accesses this remotely stored content via a network such as the Internet.

In some cases, the system calculates an association between a specific scene (or state) and coordinates in the control space, without accessing a database (or lookup table) that stores the association.

In some implementations, one or more I/O (input/output) devices display a graphical user interface (GUI). For example, the GUI may display a 2D chart with a vertical axis of Restoration and a horizontal axis of Focus, and a user may select a point on the chart to indicate the target values of Restoration and Focus, respectively. The GUI may display, on the 2D chart, points that correspond to one or more of the following: the user's current state, a target state, and a scene. Alternatively, instead of a 2D chart: (a) the GUI may display two sliders, one for Restoration and the other for Focus; and (b) the user may slide (via the GUI) each of the displayed sliders to a desired position to indicate the target values of Restoration and Focus, respectively.

In some cases, the I/O device that displays the GUI comprises a touch screen (e.g., in a smartphone). Or, for example, the GUI may be created by a set of I/O devices that include one or more of the following: a display screen or a touch screen (e.g., of a personal computer, tablet, or laptop computer), a keyboard, and a mouse.

In some cases, moving the scene closer (in the control space) to a target is achieved by modifying a scene, rather than selecting a new scene altogether. For instance, video or audio components of a scene may be "virtual", in the sense of being computer-generated, rather than being a recording of physical environment (visual or acoustic). In some cases, a virtual scene is modified, in order to move the scene closer (in the control space) to target coordinates.

Here are some non-limiting examples of how the multimedia system may automatically modify a scene, in order to present a modified scene that is closer to a target.

In some cases, the video portion of a scene may be modified: (a) by varying the blurriness of the video (and thus varying the level of detail that a user sees in the video); (b) causing new visual events to occur in the video, such as animal walking through an environment shown in the video; (c) changing the time at which (or how often) a particular visual events occurs in the video; (d) superimposing a pattern (such as brushstrokes or a geometric pattern) on the scene or varying a pattern that is superimposed on the scene; or (e) selecting a different video.

In some cases, the audio portion of a scene is modified: (a) by changing the amount or type of reverberation or echo in the sound track, and thus affecting the perceived size of a room; (b) by adding a new acoustic event, such as a bird call; (c) by modifying when or how often an acoustic event occurs (such as how often a bird call occurs); (d) by altering volume, (e) by altering relative volumes of bass, middle and treble frequencies; or (f) by selecting a different sound track.

In some cases, the room lighting portion of a scene is modified by changing color temperature, intensity, or spatial pattern of room illumination.

In some cases, a scene (or a video, audio or room lighting portion of a scene) is modified in response to changes in the user's activity (e.g., user changes from being quiet to talking to another person) or to changes in the user's environment (e.g., a phone rings or door opens). One or more sensors (e.g., cameras, accelerometers or microphones) may detect changes in user activity or changes in the user's environment.

In some cases, a multimedia system employs, for each individual user, multiple user models, one model at a time. For example, the system may employ a first user model at a first time of day and a second user model at a second time of day. Or, for instance, the system may employ a first user model when the user is engaged in a first activity and a second user model when the user is engaged in a second activity. Each user model may specify associations (or mappings) between: (a) scenes and coordinates in a control space; or (b) sensor readings (or user states) and coordinates in a control space; or (c) both. Changing from one user model to another may cause these associations (or mappings) to vary. For instance, changing from a first user model for a specific person to a second user model for the specific person may change which coordinates in the control space are associated with a specific scene, or may change which coordinates in the control space are associated with a specific set of sensor readings.

This invention may be implemented in many other ways.

For example, this invention is not limited to the scenes described above. The multimedia system may output any other scene (e.g., a scene of a mountain or of a sports race).

This invention is not limited to the control axes of Restoration and Focus. Any other control axes may be employed.

For example, in some cases, one of the control axes is a "creativity" axis. Coordinates on the creativity axis may be indicative of the extent to which a scene facilitates or is perceived to facilitate creativity or of the extent to which a user has attained a creative state. In some cases, the control space includes a "creativity" axis and one, two, three or more other control axes. For instance, a control space may have three control axes for focus, restoration and creativity, respectively.

Also, for example, in an exercise studio with weight-lifting equipment, user's perceptions of a scene may be best described by Energy and Persistence axes (the Energy axis being indicative of how energetic the scene is perceived to be, and the Persistence axis being indicative of how much the scene encourages the user to persist even when muscles are tired).

The number of dimensions in the control space may be different than two. For example, in some cases, the number of dimensions in the control space may be one, two, three, four, five, or more than five.

In some implementations, the multimedia system may include: (a) speakers, headphones or earphones that output sound; (b) a projector or an electronic visual display screen that displays a video; (c) luminaires (e.g., ceiling or wall lights, or lamps) that create room lighting; (d) scent dispensers; (e) heating or cooling devices; and (f) electric fans.

This invention is not limited to multimedia presentations that are perceptible to multiple users in a room. In some cases, at least a portion of the multimedia presentation is perceptible to only one user. For example, in some cases, sound is presented to a specific user by earphones, or at least a portion of a video or room lighting is displayed to the specific user by an Augmented Reality headset or by a Virtual Reality headset. In some use scenarios, the multimedia presentation occurs outdoors, rather than in an indoor room.

Graphical User Interface

Figure 8A:
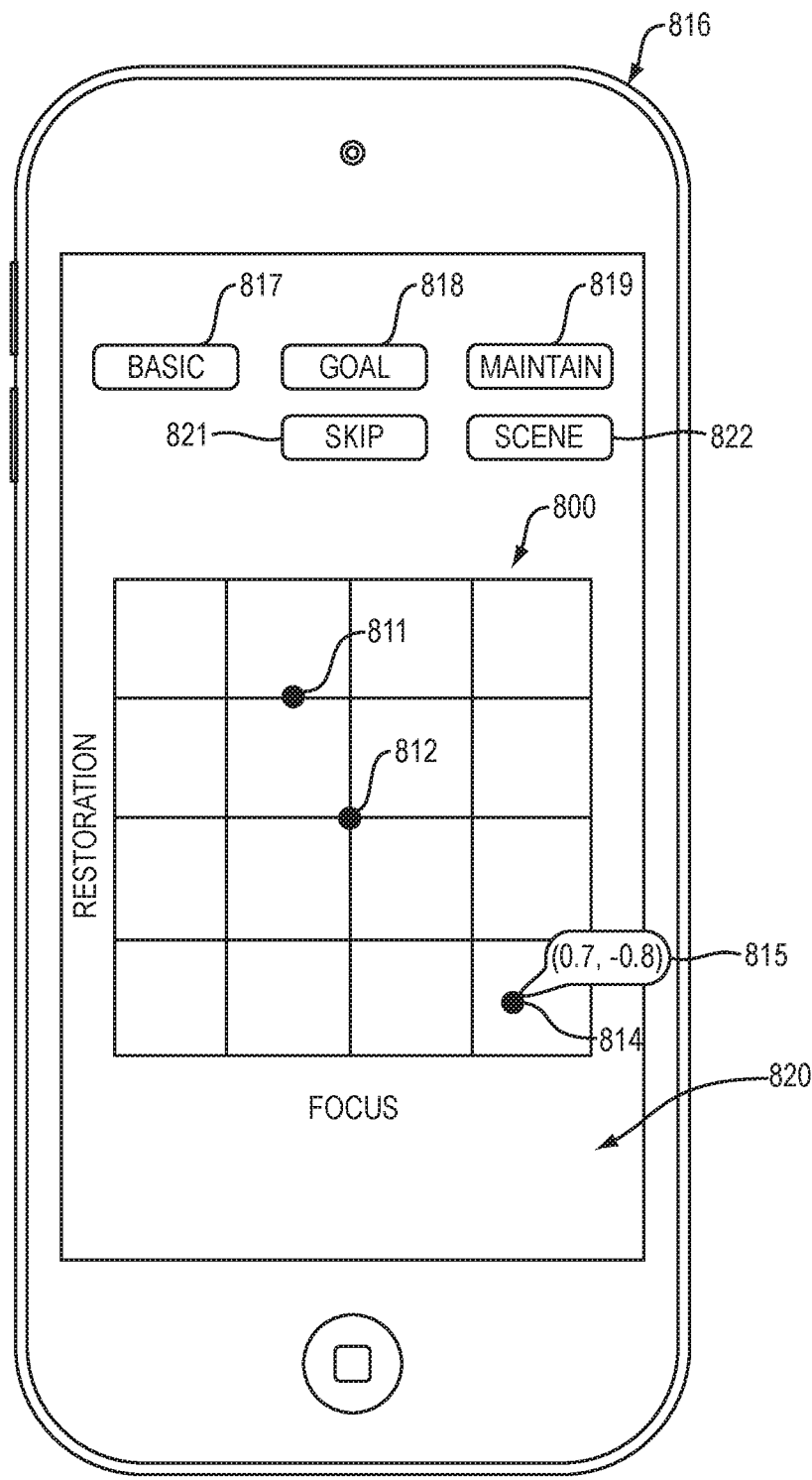
FIG. 8A shows a GUI (graphical user interface) for controlling a multimedia system.

FIG. 8A shows a graphical user interface (GUI) for controlling a multimedia presentation. The GUI may accept input from the user (e.g., user instructions or user ratings). Furthermore, the GUI may display information about the current state of the multimedia system or the current state of the user.

In the example shown in FIG. 8A, an input/output (I/O) device 816 includes a screen 820 that displays a GUI. The GUI includes a chart 800 that represents a 2D control space with two control dimensions: Restoration and Focus.

Figure 8B:
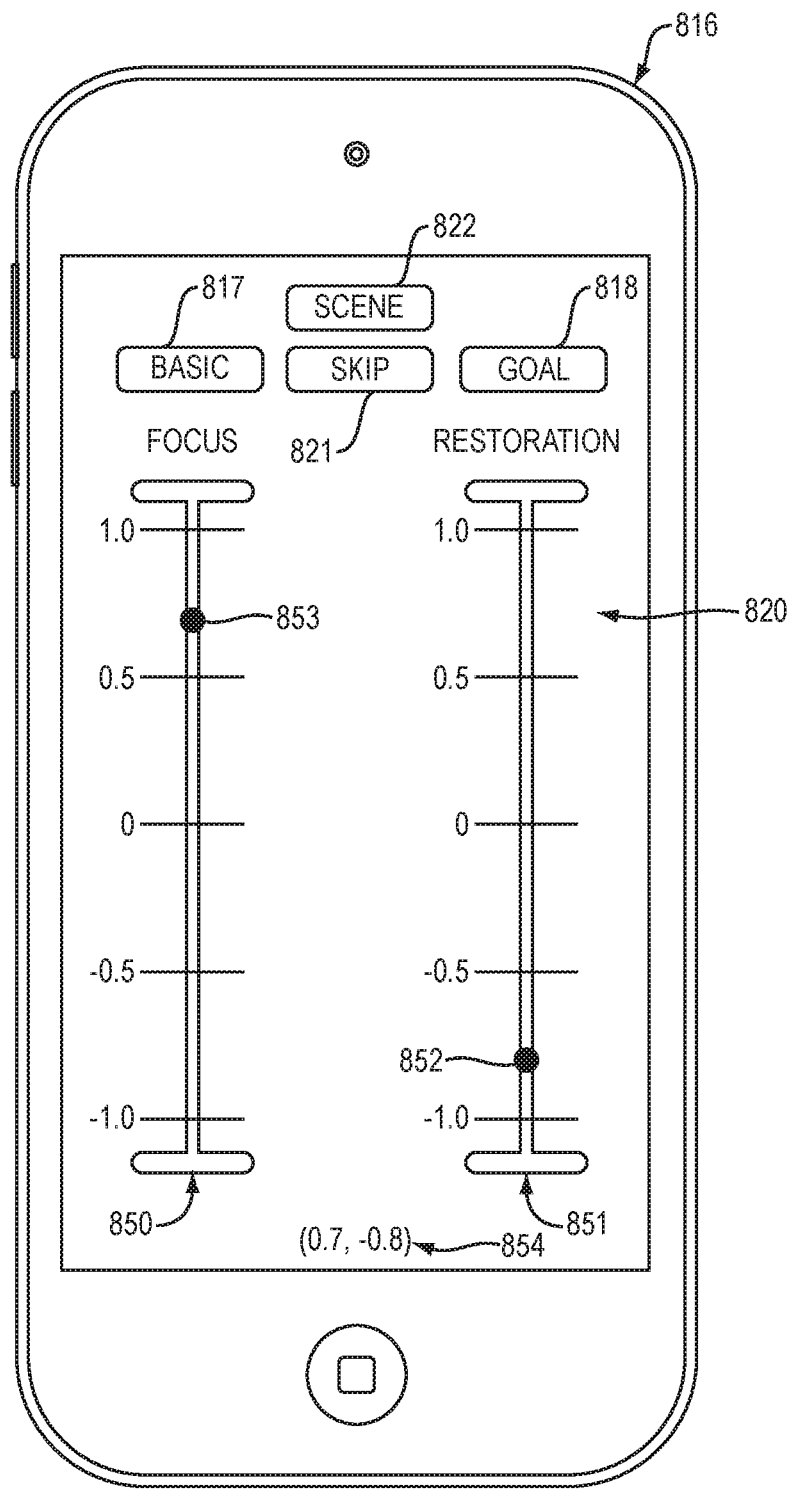
FIG. 8B shows another GUI for controlling a multimedia display.
Figure 8C:
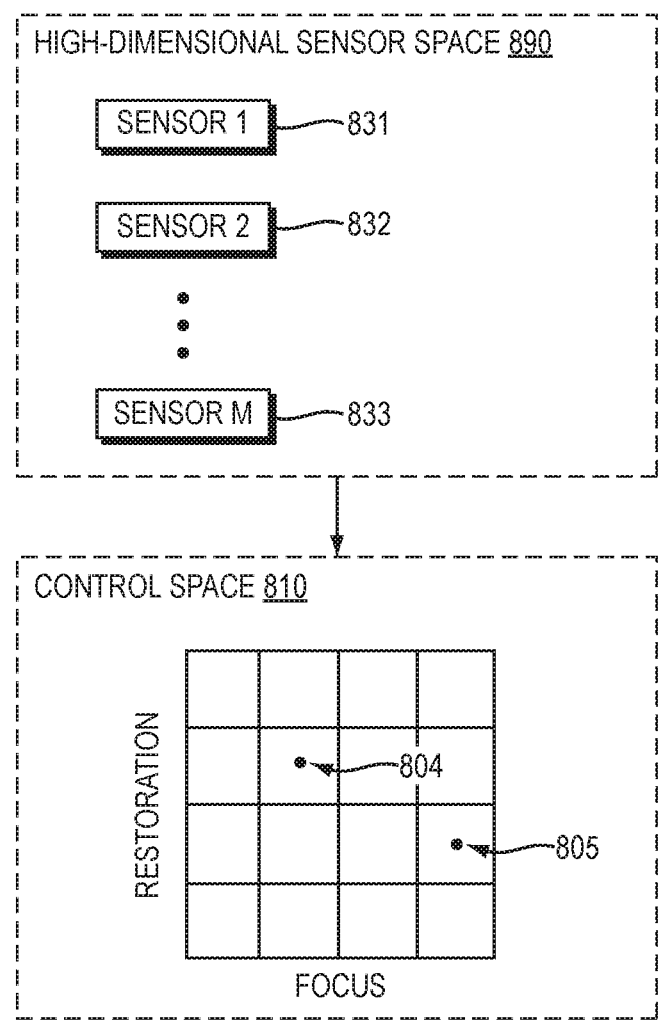
FIG. 8C shows a two-dimensional description of a user's state (in terms of Focus and Restoration) which is calculated from sensor readings.

In FIGS. 8A and 8C, each dimension in the 2D control space has a range of −1.0 to +1.0. In FIG. 8A, the center point 812 (in the chart that represents the 2D control space) has coordinates of (0,0).

In some use scenarios (e.g., where sensors are unavailable or are not working properly), a user may control the multimedia system with open loop control.

In the example shown in FIG. 8A, a user may select open loop control by selecting the "basic" button 817. For example, in an illustrative use scenario: (a) a user may select point 814 in the 2D chart and may then select "basic" button 817; and (b) these two actions together comprise an instruction to control the multimedia system with open loop control and to output a scene that has coordinates (in the 2D control space) that are at or close to the coordinates of selected point 814 in the 2D chart. Specifically, selecting point 814 in the 2D chart may cause the multimedia system to display the scene, in the system's stored scene library, that is closest to (in the 2D control space) to the selected point. For example, the scene may include: (a) a video projected on a projection screen; (b) a soundtrack; (c) room lighting; (d) scent; (e) thermal stimuli; and (f) air currents. When in open loop mode, the user may change the selected target at any time by selecting new target coordinates and then selecting the "basic" button. For example, the user may change the selected target to point 811, which has coordinates (in the 2D control space) of (−0.25, 0.50).

In some implementations of this invention, a user may simply instruct the multimedia system to present a particular scene. For instance, in FIGS. 8A and 8B, a user may instruct the system to present a particular scene by: (a) selecting the "scene" button 822, which causes the GUI to display a list of scenes; and then (b) selecting the particular scene from the list of scenes.

In the example shown in FIG. 8A, a user may select closed loop control in the Goal mode by selecting the "goal" button 818. For instance, in an illustrative use scenario: (a) a user may select point 814 in the 2D chart and may then select "goal" button 818; and (b) these two actions together comprise an instruction to control the multimedia system with closed loop control in the Goal mode and to output a scene that has coordinates (in the 2D control space) that are at or close to the coordinates of selected point 814 in the 2D chart. Specifically, selecting point 814 in the 2D chart may cause the multimedia system to display the scene, in the system's stored scene library, that is closest to (in the 2D control space) to the selected point. In the Goal mode, however, sensors take measurements of the user. These measurements are provided as feedback. If Scene A is outputted because its assigned coordinates are closest to the coordinates of the user-selected target, but Scene A instead causes the user's state to change to coordinates other than Scene A's assigned coordinates, then the system may (based on feedback from the sensors), revise Scene A's coordinates and output a different scene which has coordinates that are closer to the user-selected point than are the revised coordinates of Scene A. In the Goal State mode, the GUI may display a point (e.g., 811) that represents the coordinates of the user's current state (in addition to displaying the user-selected target, e.g., point 814). All coordinates and distances in this paragraph are in a 2D control space.

A user who has selected Goal mode may want to skip a scene that has been automatically selected by the multimedia system. In the example shown in FIG. 8A, a user may achieve this by selecting the "skip" button 821. Selecting skip button 821 may cause the system to cease presenting the "skipped" scene and to transition to another scene that is automatically selected by the system.

In many use scenarios (including many scenarios with closed loop control in Goal mode or Maintain State mode), the multimedia system transitions from presenting a first scene to presenting a second scene only if the second scene is closer—by at least a threshold amount—to the target state than the first scene is. However, in some use scenarios, this threshold approach is not followed. For instance, in some cases, if a user selects a "skip" button and a new scene to skip to, then the system may—in order to allow the user to feel that she is in control—transition to the new scene even if coordinates of the new scene are closer, by less than the threshold amount, to the target than coordinates of the current scene are. Likewise, in some cases, if a user selects a "skip" button and a new scene to skip to, then the system may—in order to allow the user to feel that she is in control—transition to the new scene even if coordinates of the new scene are further from the target than coordinates of the current scene are. Furthermore, in some cases, if a user selects the "basic" button (for open loop control) and a target state, then the system may—in order to allow the user to feel that she is in control—transition to a new scene even if coordinates of the new scene are closer, by less than the threshold amount, to the target than coordinates of the current scene are. All coordinates and distances in this paragraph are coordinates and distances in the system's control space.

In the example shown in FIG. 8A, a user may select closed loop control in the Maintain State mode by selecting the "maintain" button 819. For instance, in an illustrative use scenario: (a) a user may select the "maintain" button 819 to control the multimedia system with closed loop control in the Maintain State mode. This comprises an instruction to the system to output a scene that has coordinates that are at or close to the coordinates of the user's current state. Specifically, selecting the "maintain" button 819 may comprise an instruction for the multimedia system to display the scene, in the system's stored scene library, that is closest to the user's state as of the time at which the "maintain" button is selected. In the Maintain State mode, sensors take measurements of the user. These measurements are provided as feedback. If Scene A is outputted because its assigned coordinates are closest to the coordinates of the user's state (as of the time that the "maintain" button is selected), but Scene A instead causes the user's state to change to coordinates other than Scene A's assigned coordinates, then the system may (based on feedback from the sensors), revise Scene A's coordinates and output a different scene which has coordinates that are closer to the user's state (as of the time that the "maintain" button is selected) than are the revised coordinates of Scene A. In the Maintain State mode, the GUI may display a point (e.g., 811) that represents the coordinates of the user's current state. All coordinates and distances in this paragraph are in a 2D control space.

FIG. 8B shows another GUI for controlling a multimedia presentation. In the example shown in FIG. 8B, an input/output (I/O) device 816 includes a screen 820 that displays a GUI. The GUI displays two axes 850, 851 that, taken together, represent a 2D control space with two control dimensions: Restoration and Focus. A user may select a point (e.g., 853) along the Focus axis 850 and may select a point (e.g., 852) along the Restoration axis 851. For example, the GUI may display the two axes 850, 851 as sliders, and a user may interface with the GUI in such a way that the user causes a slider displayed in the GUI to move to a desired point along each axis, respectively. A user may employ the GUI in FIG. 1B for open loop control, in the same way described above for FIG. 8A (except that the GUI in FIG. 8A displays the two control axes in a single 2D chart and the GUI in FIG. 8B displays the two control axes separately). Likewise, a user may employ the GUI in FIG. 8B for closed loop control in the Goal mode, in the same way described above for FIG. 8A (except that the GUI in FIG. 8A displays the two control axes in a single 2D chart and the GUI in FIG. 8B displays the two control axes separately).

The GUI may display the coordinates of a selected point or pair of points. For example, in FIG. 8A, when a user clicks on point 814, the GUI may cause bubble 815 to display the 2D coordinates of point 114. Likewise, in FIG. 1B, when a user selects a pair of points (e.g., 852, 853) on the Focus and Restoration axes, the GUI may display the coordinates of this pair of points (e.g., coordinates 854).

Mapping User State to Control Axes

In illustrative implementations, sensors take measurements regarding a user's state.

In illustrative implementations, the multimedia system maps sensor readings indicative of a user's state to a point in a low-dimensional control space. For example, the system may map sensor readings (indicative of a user's state) to a point in a 2D control space with two control dimensions (e.g., Restoration and Focus).

In some implementations, multiple types of sensors each take one or more different types of sensor readings, and thus the sensor space (of sensor readings) may have more dimensions than the two-dimensional control space.

FIG. 8C shows a two-dimensional description of a user's state (in terms of Focus and Restoration) which is calculated from sensor readings.

In the example shown in FIG. 8C, a high-dimensional sensor space 890 comprises samples taken by multiple (e.g., five or more) different sensors (e.g., 838, 832, 833). Each of these sensors may comprise a different kind of sensor. For example, the sensors may include a video camera, optical sensor, EDA (electrodermal activity) sensor, three-axis accelerometer, three-axis gyroscope, ECG (electrocardiography) sensor, EEG (electroencephalography) sensor, thermometer, and pulse oximeter. Their measurements may be processed to derive multiple different parameters, including heart pulse rate, RR interval, heart rate variability, heart waveform, respiration rate, respiration waveform, skin temperature, blood volume pulse, 3-axis acceleration, facial expression, EEG alpha theta band entropy, and EEG gamma beta band entropy. Each of these different parameters may comprise a dimension of the high dimension sensor space.

In FIG. 8C, the system processes the sensor readings to derive values in a 2D control space 810 that are indicative of the user's state. In FIG. 8C, the two axes of the control space are Restoration and Focus. In FIG. 8C, control space 880 has less dimensions than does sensor space 890.

In an illustrative use scenario shown in FIG. 8C: (a) the multimedia system processes sensor readings and determines that a user's state has the coordinates (in the 2D control space) of point 804, which coordinates are (−0.25, +0.25), that is −0.25 along the Focus axis and +0.25 along the Restoration axis; (b) then the user's state changes; and (c) then the system processes sensor readings and determines that the user's new state has the coordinates (in the 2D control space) of point 805, which coordinates are (0.75, −0.25), that is 0.75 along the Focus axis and −0.25 along the Restoration axis.

Mapping Control Axes to Multimedia Output

In illustrative implementations, a low dimensional control space controls a higher dimensional set of multimedia outputs.

In some cases, a multimedia system includes many different transducers each with many different outputs, and the settings space (of multimedia settings that produce specific scenes) has more dimensions than the two-axis control system.

Figure 9A:
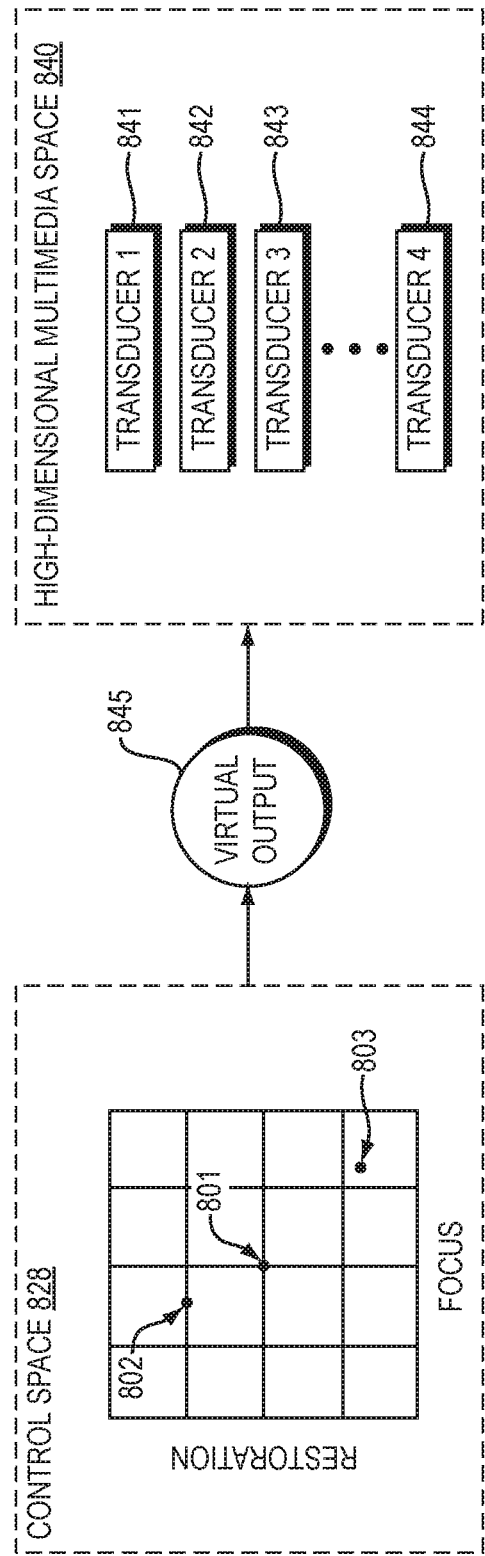
FIG. 9A shows a two-dimensional control space that is employed to control a higher dimensional set of multimedia outputs.

FIG. 9A shows a two-dimensional control space 828 that is employed to control outputs in a higher dimensional multimedia space 840. In FIG. 9A, the dimensions of the 2D control space 828 are Restoration and Focus.

In FIG. 9A, the multimedia output includes output by a set of multiple transducers (e.g., 841, 842, 843, 844). For example, these transducers may comprise one or more video projectors, display screens, speakers, luminaires (such as ceiling or wall light fixtures or lamps), scent dispensers, heaters or cooling devices, and fans.

In FIG. 9A, point 802 has coordinates of (−0.25, +0.5)—that is, −0.25 on the Focus axis and +0.5 on the Restoration axis. In FIG. 9A, point 801 has coordinates of (0,0) and point 803 has coordinates has coordinates of (0.7, −0.7). Thus, in FIG. 3A: (a) multimedia output that corresponds to point 803 is more conducive to focus than is multimedia output that corresponds to point 802; and (b) multimedia output that corresponds to point 802 is more conducive to Restoration (e.g., a casual, relaxed state) than is multimedia output that corresponds to point 803.

Different points in the 2D control space may be associated with different scenes, in a set of scenes stored in the system's scene library. For example, in FIG. 9A: (a) the multimedia system may be configured to output a large number of scenes, including scenes G and H; (b) points 802 and 803 may be associated with scenes G and H, respectively; (c) in open loop control, selecting point 802 in the 2D control space may comprise an instruction to display scene G; and (d) in open loop control, selecting point 803 in the 2D control space may comprise an instruction to display scene H.

In some cases, coordinates in the 2D control space are transformed into a virtual set of multimedia outputs 845, which are in turn transformed into instructions for the actual multimedia transducers (e.g., 841, 842, 843, 844). An advantage of the virtual set of multimedia outputs 845 is that it is not specific to any particular room. A computer may derive, from the virtual set of multimedia outputs 845, instructions for the actual multimedia transducers (e.g., 841, 842, 843, 844), based on a transform that maps from the virtual set of outputs to settings of multimedia transducers in a specific room.

Figure 9B:
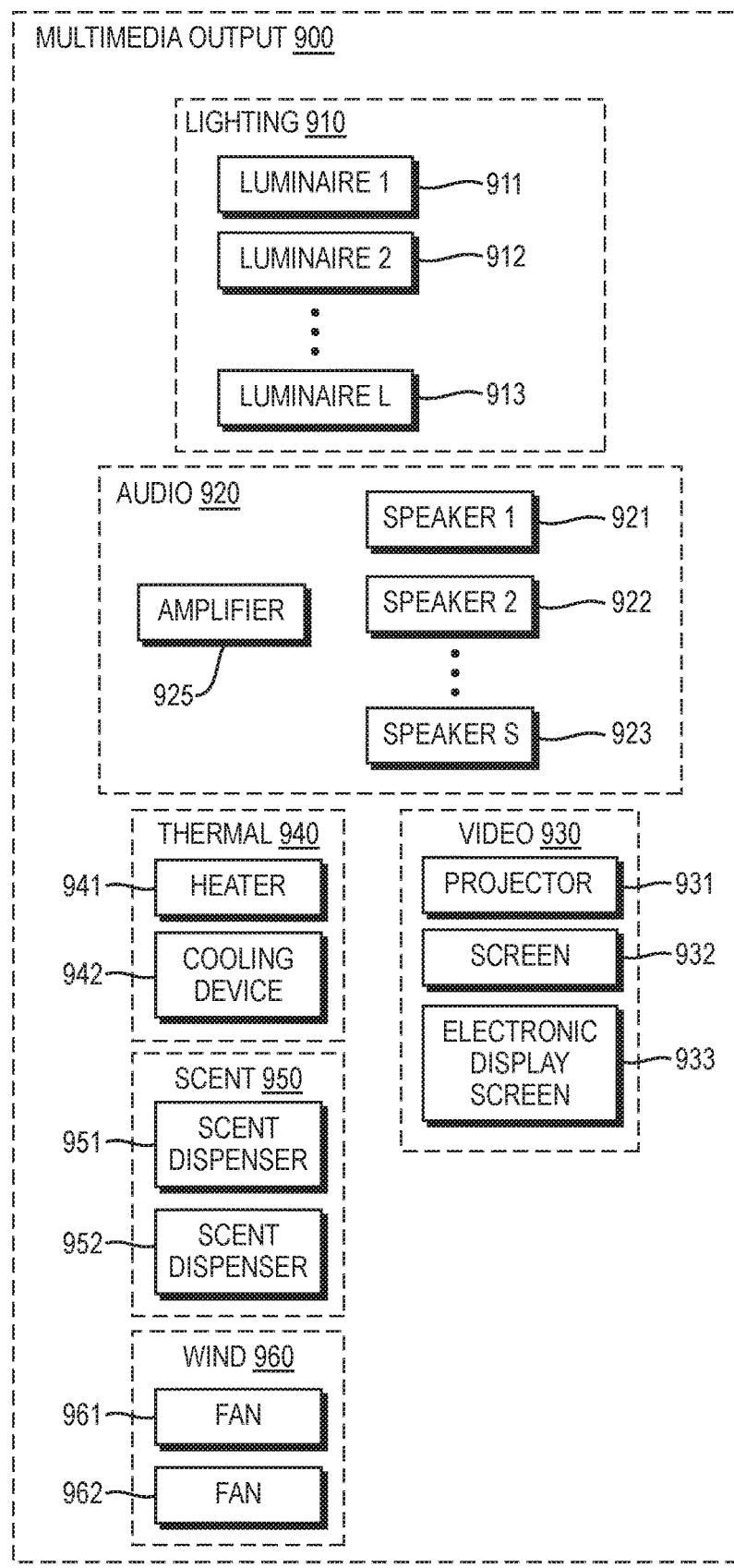
FIG. 9B shows multimedia outputs and hardware that produces them.

FIG. 9B shows: (a) a high dimensional set of multimedia outputs 900; and (b) hardware that produces these outputs. In the example shown in FIG. 9B, the multimedia outputs include lighting 910, audio 920, video 930, thermal 940, scent 950 and wind 960. Lighting 910 includes light provided by multiple luminaires (e.g. 911, 912, 913) such as ceiling and wall light fixtures and lamps. Audio output 920 may be produced by an amplifier 925 and a set of one or more speakers (e.g., 921, 922, 923). Video output may be produced (a) by a projector 931 and a screen 932 unto which images are projected, or (b) by an electronic display screen 933. Thermal effects 940 (e.g., heating or cooling) may be produced by one or more heaters 941 or cooling devices 942. Scent 950 may be produced by one or more scent dispensers 951, 952. Wind, breeze or air flow may be produced by one or more electric fans 961, 962.

Hardware

Figure 10:
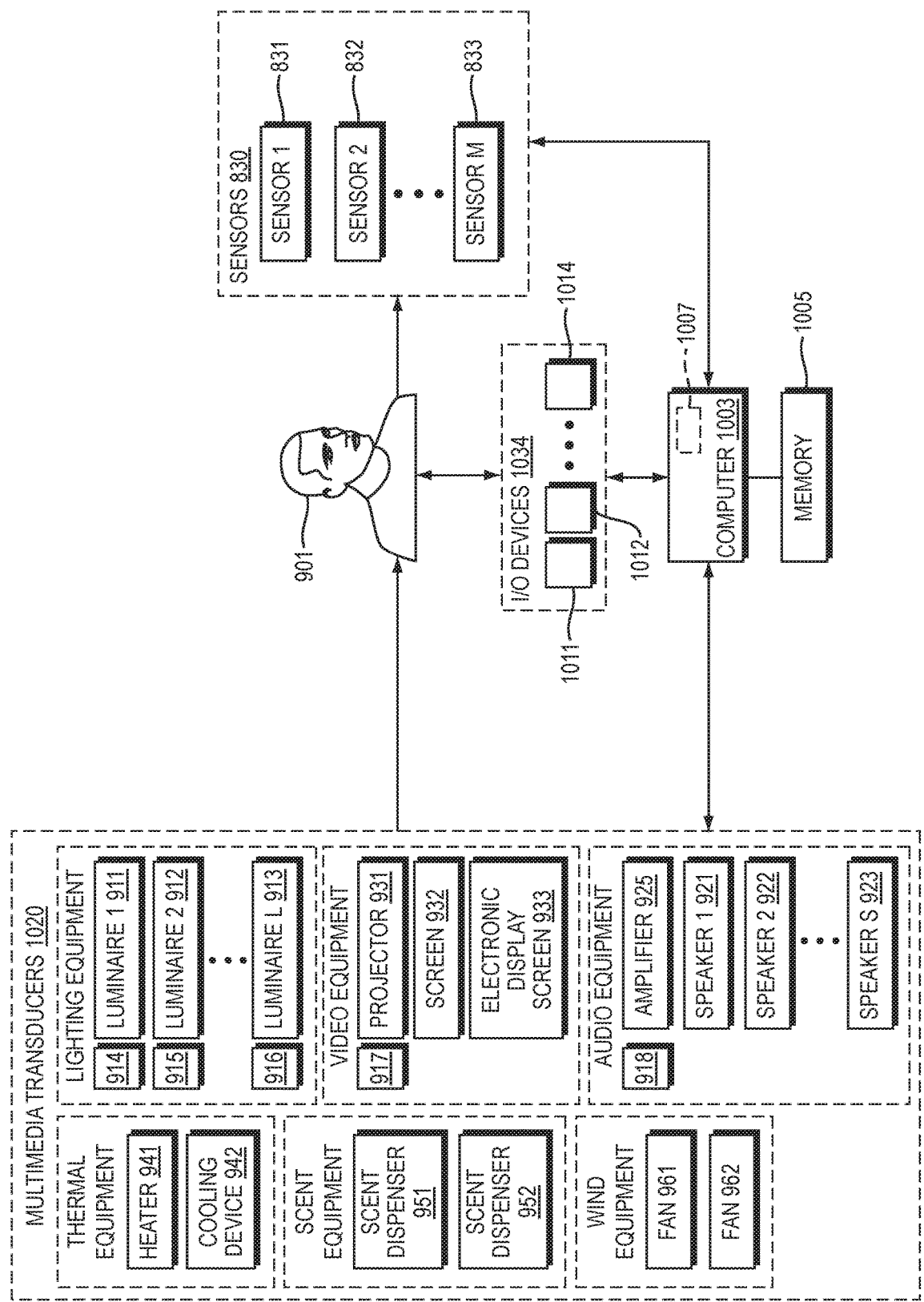
FIG. 10 illustrates hardware of a multimedia system.

FIG. 10 illustrates hardware of a multimedia system, in an illustrative implementation of this invention.

In FIG. 10, the multimedia system includes a set of sensors 830, including sensors 831, 832, 833 that take measurements of a user. For instance, sensors 830: (a) may take measurements regarding physiological parameters of the user, or regarding the user's activity level, type of activity, affect, facial expression, gaze direction, head orientation, or posture; (b) may recognize gestures of the user; (c) may detect the tone, content or other features of the user's verbal or written statements; or (d) may monitor actions taken by the user on computer. These sensor readings may be taken in real-time. Sensors 830 may be located in any position suitable for taking measurements of the user. For example, one or more of sensors 830: (a) may be worn on, or attached to, or located in, any position of a user's body; or (b) may be located at a distance from a user (such as a webcam or other camera that captures video images of the user).

In addition, the system in FIG. 10 includes multimedia transducers 1020, such as: (c) luminaires (e.g., 911, 912, 913) for lighting a room, table, desk, or other area or surface; (b) video equipment, such as a projector 931, screen 932, or electronic display screen 933; (c) audio equipment, including an amplifier 925 and speakers 921, 922, 923; (d) thermal equipment, such as heaters 941 or cooling devices 942; (e) scent dispensers 951, 952; and (f) electric fans 961, 962 for blowing air toward or away from a human user. These multimedia transducers may output scenes, where each scene comprises a specific combination of room lighting, video, sound, scent, thermal effects and wind effects.

Projector 931 may comprise any type of video projector, including: (a) a LCD (liquid crystal display) projector with LCD light gates; (b) a DLP (digital light projector) or other projector that includes digital micromirror devices (DMDs); (c) an LCoS (liquid crystal on silicon) projector (e.g., that processes light in the Fourier domain); (d) a CRT (cathode ray tube) projector; (e) a projector that employs an array of LEDs (light-emitting diodes) as a light source and that employs LCD, DLP, DMD or LCoS technology for image creation; (f) a laser diode projector, (g) a hybrid LED and laser diode projector; or (h) any other hybrid of any of the foregoing projector technologies.

Electronic display screen 933 may comprise an electronic visual display screen. For instance, electronic display screen 933 may comprise any type of electronic visual display screen, such as an LCD screen, a TFT-LCD (thin film transistor LCD) screen, a CRT screen, a plasma display panel, an LED screen, an OLED (organic LED) screen, an EL (electroluminescence) screen, a CRT screen, an FED (field emission display) screen, a VFD (vacuum fluorescent display) screen, an SED (surface-conduction electron-emitter display) screen, an active electronic display screen, or a passive electronic display screen. Or, for example, the electronic visual display screen may comprise a touch screen, such as: (a) a capacitive touch screen (including a touch screen that employs surface capacitance, projected capacitance, mutual capacitance or self-capacitance to detect touch); (b) a resistive touch screen; or (c) a touch screen that employs infrared acrylic projection, optical imaging, dispersive signal technology or acoustic pulse recognition.

In some cases: (a) electronic display screen 933 is employed; and (b) projector 931 and screen 932 are omitted. In some other cases: (a) projector 931 and screen 932 are employed; and (b) electronic display screen 933 is omitted.

In FIG. 10, a user 901 experiences a scene produced by the multimedia transducers 1020. For example, user 901 may, while performing a task, experience the scene by: (a) listening to a sound track; (b) looking up at a video sometimes; (c) smelling scents that are wafted through the air from a scent dispenser, (e) feeling heated or cooled by heaters or cooling devices; (f) feeling air currents; and (g) being aware of illumination by room lighting. While the user experiences the scene, sensors 830 may take measurements of the user's state.

In FIG. 10, user 901 may interact with a set of input/output (I/O) devices 1034, such as I/O devices 1011, 1012, 1014. For example, the I/O devices may include one or more of: a touch screen, a display screen, a monitor screen, a microphone, earphones, speakers, a keyboard, and a computer mouse. The I/O devices may accept instructions that are inputted by a user, and may output information to a user.

In FIG. 10, one or more computers may control the multimedia system. For example, computer 1003 may control and interface with sensors 830, and may process sensor readings to determine a user's state. Computer 1003 may assign coordinates (in a control space) to a user's state. Likewise, computer 1003 may assign coordinates (in a control space) to a scene. Computer 1003 may control and interface with multimedia transducers. For example, computer 1003 may control microcontrollers 914, 915, 916, 918, which may in turn control luminaire 911, luminaire 912, luminaire 913, and amplifier 925, respectively. Also, computer 1003 may control microcontroller 917, which may in turn control projector 931 or electronic display screen 933. Also, computer 1003 may control scent dispensers 951, 952, fans 961, 962, heater 941 and cooling device 942. Computer 1003 may cause the multimedia transducers to output a scene that maps to specific point in a control space. Computer 1003 may store data in, and read data from, a memory device 1005. Computer 1003 may communicate wirelessly with one or more other devices (either in or external to the multimedia system) via wireless module 1007.

In FIG. 10, computer 1003 may, depending on user instructions, cause the multimedia system to operate with open loop control or closed loop control. For example, in closed loop control, computer 1003 may, in response to user instructions: (a) cause the system to operate in Goal mode; or (b) cause the system to operate in Maintain State mode.

Closed Loop Control

Figure 11:
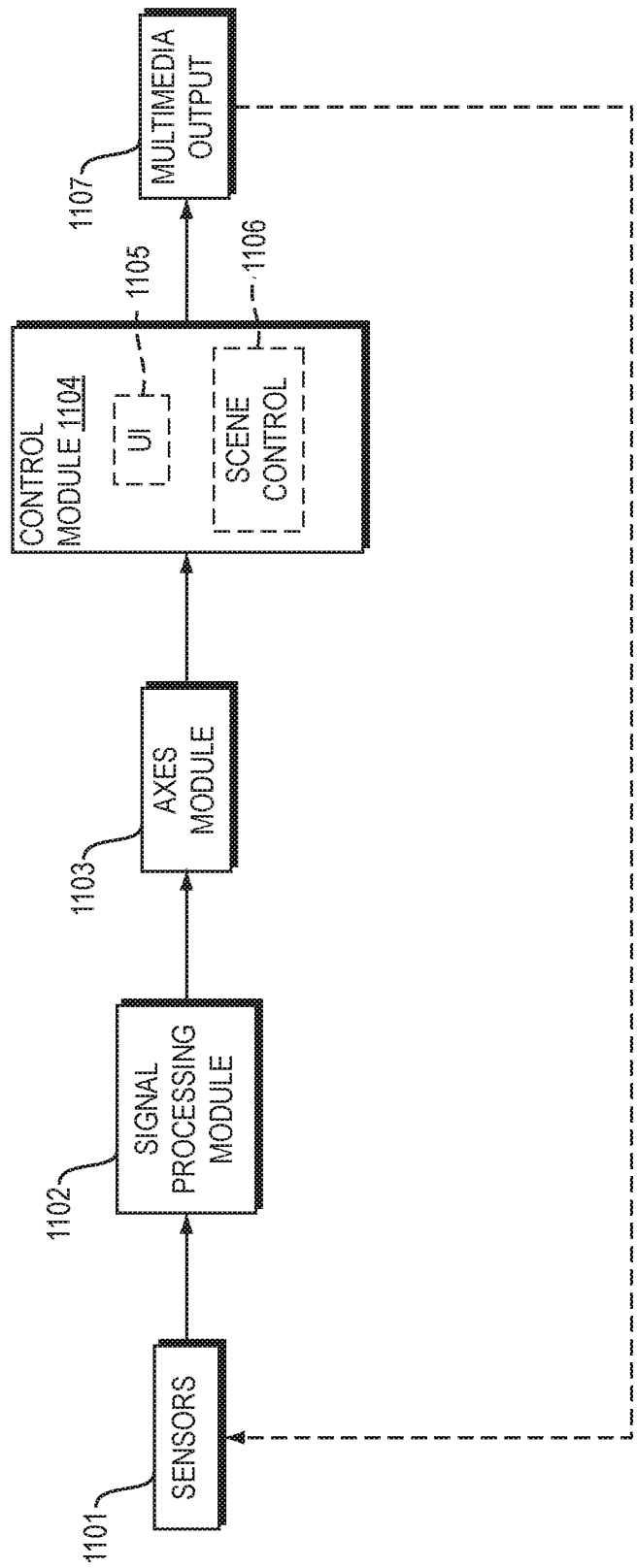
FIG. 11 shows closed-loop control of a multimedia system.

FIG. 11 shows closed-loop control of a multimedia system, in an illustrative implementation of this invention. In FIG. 11: (a) sensor readings are accepted by a computer as feedback, and (b) this feedback is used in control of the multimedia system.

In FIG. 11, sensors 1101 take measurements of a user while the user is experiencing multimedia output 1107 (e.g., video, sound, room lighting, scent, heating or cooling, air movement). In FIG. 11, one or more computers execute software programs that include a signal processing module 1102, an axes module 1103 and a control module 1104. Signal processing module 1102 processes sensor readings. Axes module 1103 transforms the processed sensor readings into coordinates in a 2D control space (e.g., into a value on the Restoration control axis and into a value on the Focus control axis). Control module 1104 includes: (a) user interface (UI) 1105 for interacting with a user; and (b) a scene control module 1106. The scene control module 1106 outputs instructions that control the multimedia transducers and thus control output 1107 of these transducers. Thus, in FIG. 11, scene control module 1106 controls which scene is outputted.

Prototype

The following 64 paragraphs describe a prototype of this invention. This prototype is a non-limiting example of this invention.

In this prototype, either open loop control or closed loop control may be employed. In this prototype, closed loop control may be in Goal mode or in Maintain State mode.

In this prototype, the control dimensions are Focus and Restoration.

In this prototype, the multimedia system is located in a windowless rectangular room, 4.2 m by 2.8 m with a ceiling height of 2.6 m.

In this prototype, luminaires provide light with high dynamic range and controlled color temperature. In addition, a video creates immersive illusions. In this prototype, the multimedia system synchronizes light and visual images with sound.

In this prototype, the multimedia system employs controllable lighting, projection, and sound, which are installed in a room and furniture. For lighting, this prototype employs individually controllable multi-channel fixtures. For sound, the prototype has two options, an ambisonic sound system using four speakers and alternatively a pair of wearable noise canceling headphones. The headphones offer control of ambient noise. A high-luminosity output projector with short throw lens projects a video onto a rear projection screen. The rear projection screen comprises a 1.83 m by 0.76 m light-diffusing acrylic.

In this prototype, a multimedia system is deployed in a room.

In this prototype, the multimedia system includes ceiling luminaires (including wall-washing fixtures and downlight fixtures) that provide room lighting. In this prototype, the multimedia system also includes: (a) projector and a rear projection screen for displaying a video; and (b) speakers for outputting sound. In this prototype, the multimedia system also includes sensors that take measurements of a user (e.g., while a user is sitting in chair and using a laptop computer that is located on desk). For example, a wide-angle webcam video camera may take images of a user while the user is sitting in a chair.

In this prototype, a scene library contains over 30 atmospheric environments based on real places. These include beaches, natural landscapes, indoor spaces such as libraries, cafes and museums, and scenes of metropolitan cities, train rides, and even a roller coaster ride. These scenes cover a wide range of effects and perspectives. They have different themes (nature, urban, indoor) and experiential attributes (motion, repetitiveness, color, brightness). Each scene contains video and sound data, a lighting configuration file and meta information of key characteristics.

In this prototype, the lighting configuration file is in JavaScript Object Notation (JSON) format, and contains position, size, intensity, and color information of virtual light sources.

In this prototype, virtual light sources, different than the actual physical installation in the space, may be positioned anywhere on the ceiling. The virtual ceiling is an x-y-plane. A room model of the physical setup converts the virtual light information to actual light settings. This separation of lighting configurations and the physical lighting layout is advantageous, because it makes the configuration file applicable for any space that may be described with a room model. Meta information, in JSON format, includes sound level, brightness level, light color temperature, light direction, keywords, dominant colors, descriptive name, ID, length, etc.

In this prototype, a computer executes software comprising a Scene Control Server. The Scene Control Server is implemented in Python™ and facilitates real-time control of output capabilities and manages transitions between atmospheric scenes. In this prototype, the Scene Control Server includes a Room Model and a Transition Handler.

In this prototype, upon a scene transition request, the Transition Handler loads the target scene from the Scene Library and initiates a fading effect with the specified transition speed. Subsequently, the Video Player software, which is responsible for video projection and sound, executes the desired transition. The transition typically means that video and sound of the current scene are gradually faded out and, after a short break in a neutral state, video and sound of the new scene are faded in. When the transition is completed, the Video Player sends a status update to the Scene Control Server. The Video Player is implemented in Javascript and displayed through a web browser. Video and sound are played in a loop. At the end of the video and sound file, typically an H.264 encoded .mp4 file, a cross-fade is initiated to a specified or random position in the video and soundtrack.

In this prototype, for lighting transitions, the Transition Handler interfaces with the Room Model. The Room Model is a transfer function from a virtual space to the actual lighting installation in the prototype office. The Room Model contains information about the physical lighting installation in the room and maps the virtual light sources to the existing lighting system. The resulting RGB channel brightness settings are then sent to the lighting server, which controls the lighting systems in the prototype space.

In this prototype, a Scene Control API is a Websocket interface that facilitates Scene Control Commands and Video Player Commands.

In this prototype, a scene library includes a set of stored scenes, including the following five atmospheric scenes. The video lengths for these scenes vary. When a video reaches the end, it may dissolve to the beginning.

Forest Scene: In this prototype, during the Forest Scene, a video projection shows a forest in autumn. In this video: (a) a clear, shallow mountain stream flows through a dense, partially red-colored forest; (b) there is no camera motion; and (c) the perspective suggests that the viewer is resting, elevated over the stream. During the Forest Scene, a user hears the sound of the river and occasionally birds in the background. Low intensity, warm lighting completes this scene. Two virtual light sources in the center of the ceiling correspond to the forest opening and direction of lighting in the video.

Library Scene: In this prototype, during the Library Scene, a video shows a study room in a university library. In this video: (a) a number of students are present; (b) they are sitting at tables and studying independently; (c) there is no camera motion; (d) the viewer appears to be sitting at one of the tables in the library. During the Library Scene, a user hears the ambient sound of the space, such as movements, or when someone enters or leaves. High intensity, white light characterizes the ambiance of the room. A virtual light source in the center of the ceiling corresponds to the fluorescent ceiling lights in the image.

Kites Scene: In this prototype, during the Kites Scene, a video shows three kites against the background of a blue sky. In this video: (a) the horizon is not visible; (b) each kite has a unique shape, flying speed and trajectory; (c) the third kite appears and disappears from the screen depending on its movement; (d) there is no camera motion, but compared to the Library and Forest scenes, there is significantly more visual action; and (e) the camera perspective suggests that the viewer is resting and looking up to the sky. During the Kites scene, a user hears ocean waves crashing in the background. During the Kites scene, cold, high intensity, primarily indirect, lighting complements the color and openness of the sky.

City Scene: In this prototype, during the City Scene, a video shows a walk through the Shibuya district in Tokyo, Japan. In this video: (a) the camera moves steadily at walking speed through crowds of pedestrians; (b) the video captures activities of a busy walking district with colorful billboards, shops, and buildings from a first person perspective. During the City Scene, a user hears (among other things) the sound from the street, some indistinct speech, music coming from the stores, etc. During the City Scene, a mix of direct and indirect, high-intensity white light provides room lighting, which corresponds with the weather in the video image.

Neutral Scene. In this prototype, during the Neutral Scene, room lighting is uniform, white and at medium intensity. However, in the Neutral Scene, the multimedia system does not display any video and does not output any sound.

In this prototype, user surveys are conducted to determine how users perceive scenes that are generated by the multimedia system. In these surveys, users provide ratings for different scenes.

In this prototype, two measures are employed to determine users' perception of the scenes. These two measures are Perceived Focus Potential and Perceived Restoration Potential. Users rate the scenes, and the ratings are collected. In this prototype, all ratings use a five-point Likert scale ranging from −2 ("very low") to 2 ("very high"). Perceived Focus Potential describes the scene's suitability for demanding work tasks that require mental concentration, as perceived by the user. Likewise, Perceived Restoration Potential describes how suitable a scene is for restoring from a stressful situation. Users rate each atmospheric scene on seven variables.

In this prototype, two questions in the survey ask users to rate the suitability of the rendered scene for specific work scenarios. The first question invites the user to imagine herself in a situation where she is full of energy and about to start a challenging task. This rating measured the Perceived Focus Potential. The second question asks the user to imagine herself in a position where she needs to recover from the prolonged mental effort. This rating contributed to the Perceived Restoration Potential.

In this prototype, for an additional five questions, users rate the atmospheric scene on five facets of a restorative environment, Compatibility, Coherence, Being-away, Fascination, and Scope. In this prototype, the Perceived Restoration Potential is the mean of all restoration-related ratings.

In this prototype, user perceptions differ significantly among the atmospheric scenes for both Perceived Focus Potential and Perceived Restoration Potential (PRP).

In this prototype, Forest and Kites scenes are usually perceived as both restorative and conducive to focused activities. On average, the City scene is perceived as promoting restoration but not focus. Library and Neutral scenes are usually perceived as less restorative, but suitable for focus. In this prototype: (a) there is a substantial variance among users' ratings; and (b) response correlates with personal preference. For instance, in this prototype, personal appreciation for an environment has a significant influence on restoration outcome. Nature scenes are usually more restorative than urban landscapes. Atmospheric scenes, such as the Forest or Kites scenes, are usually perceived as more restorative than the Neutral office. In this prototype, users tend to rate the Forest and Kites scenes as more restorative than the City scene, and the City scene as more restorative than the Neutral office.

In this prototype, high variance in the perceptual ratings suggests strong personal bias. A user's preference of ambiance depends on both the context and the individual. For example, the City scene is restorative for some users, but causes the opposite reaction for others.

In this prototype, sensors are used to evaluate users' response to atmospheric changes. They are also used for real-time activity recognition and context-aware dynamic control. Sensor Collection Server software manages and stores incoming sensor data streams. Using the Sensor Collection Server, sensors may be easily added or removed from the system.

In this prototype, wearable sensors are employed for monitoring. The sensors include a heart rate and monitor chest strap (Zephyr™ Bioharness 3), a wrist worn monitoring device (Empatica® E4), and EEG headband (InteraXon Muse™ headband).

In this prototype, facial feature tracking is performed using the Intraface software library (CMU Human Sensing Laboratory and University of Pittsburgh Affect Analysis Group, Intraface) in combination with a wide-angle USB camera (Logitech®, Genius, WideCam F100). In this prototype, the wide-angle USB camera is placed in front of the user, on top of the user's computer screen. It captures the user's face and part of the upper body. A wide-angle camera is desirable to capture the user's facial expression even when the user's face moves.

In this prototype, the Zephyr™ Bioharness 3 sensor takes the following measurements at the following sampling rates: Heart Rate (1 Hz), RR Interval (18 Hz), ECG (250 Hz), Respiration Rate (1 Hz), Breathing Waveform (25 Hz), Posture (1 Hz), Activity Level (1 Hz), Peak Acceleration (1 Hz), and 3 Axis Acceleration (100 Hz).

In this prototype, the Empatica® E4 sensor takes the following measurements at the following sampling rates: 3

Axis Acceleration (32 Hz), Blood Volume Pulse (64 Hz), Inter Beat Interval, Electrodermal Activity (4 Hz), Skin Temperature (4 Hz).

In this prototype, the facial tracking system (including video camera and Intraface software): (a) takes measurements of 49 facial feature points, 3D head orientation, and 3D viewing orientation; and (b) identifies six emotions (neutral, angry, disgust, happy, sad and surprised). The facial tracking system records and processes videos at approximately 10 fps with a resolution of 1280 by 720 pixels.

In this prototype, the Muse™ headset takes measurements of EEG alpha theta band entropy and EEG gamma beta band entropy.

In this prototype, the Sensor Collection Server software manages incoming data streams and data logging to storage. This module is implemented in Python™ software using the Twisted library—an asynchronous, event-driven networking engine. This network engine builds on the reactor pattern, in which a reactor loop multiplexes incoming requests to the appropriate request handler. Request handlers are implemented for each sensor with the service to parse, format and log incoming data for example as .csv files.

In this prototype, the following sensor measurements are employed as indicators of focus or restoration.

In this prototype, heart rate variability (HRV) is calculated as follows: A Zephyr™ Bioharness 3 sensor records RR, which measures the time interval between consecutive heart beats. This signal is generated using the ECG (electrocardiography) waveform sampled at 1000 Hz. For the calculation of HRV, the recorded RR interval series is converted to an equidistantly sampled series by cubic spline interpolation. The resulting sample rate is 18 Hz. A standard deviation of RR intervals (SDNN) method is employed to compute HRV. SDNN is calculated for consecutive overlapping sections of 1 min of the resampled RR data, then a moving average filter with a window length of 10 s is applied. The result is set to the right edge of the window.

In tests using this prototype, mean HRV in restorative conditions was 1.5 times higher than in non-restorative scenes. HRV was also on average 20% more likely to be above personal mean and 36% more likely to be more than one standard deviation higher in restorative conditions. There were no significant differences of HRV between focus and non-focus conditions.

In this prototype, head orientation information is employed to estimate where users directed their visual attention. A lifted head position is associated with attention towards the projection screen, which is tall and further away. Accordingly, looking at the table or laptop computer results in a dropped head orientation. A restorative environment naturally draws attention, whereas a focus environment tends not to create distraction. Head orientation is estimated by the Intraface software.

In this prototype, head orientation is processed in two ways. The first variation, which we refer to as Viewing Scene, only uses head pitch angle above average. The Viewing Scene measure only considers lifted head positions and is used for the Restoration indicator. The second Head Orientation measure, which we refer to as Viewing Desk, includes the full range of possible head pitch angles. Users' head pitch angle faces more downwards in focus than non-focus environments, which results in significant mean differences. Thus, the Viewing Desk measure is used for the Focus indicator.

In this prototype, facial expression indicates whether the user exhibits emotional changes. The Neutral feature, which is computed by the Intraface software library, is employed.

The Neutral feature is reported as a confidence level between 0 and 1, with a value of 1 indicating a confident detection of Neutral expression. It is not normalized per person in post processing. Neutral facial expression is significantly more often detected in focus than non-focus environments.

In this prototype, low respiration rates are indicators of a relaxed and restorative state of user. Thus, respiration rate is an input to the Restoration indicator.

In this prototype, EEG spectral analysis is employed. The EEG spectral analysis may divide the signal into five frequency bands that are associated with different mental states. Alpha waves may be observed in healthy individuals when they are awake but are in a relaxed, resting mental state or when their eyes are closed. An increase of Theta activity, on the other hand, has been associated with a state of drowsiness in adults. Beta and Gamma waves are of higher frequency and occur during focused mental activity.

In this prototype, an entropy-based approach is employed to compute Focus and Relaxation scores from relative EEG spectral band powers. For the Relaxation score, Tsallis entropy is computed using the relative spectral power of the Alpha and Theta bands. For the Focus score, EEG Gamma-Beta, Gamma and Beta bands are used. The Tsallis entropy $H_{T_s}$ is a non-logarithmic parameterized entropy measure defined as $$H_{T_s} = \frac{1}{\alpha - 1} \cdot \sum_i (p_i - p_i^\alpha)$$

In this prototype, a Processing API provides real-time access to sensor data from the Sensor Collection Server software. A subscriber to this service opens a TCP socket to connect. Upon connection, it receives sensor updates at a specified update rate. Data packages typically contain a data type, timestamp and value vector in JSON format. Example data packages with dummy data are:

"type": respiration,
"timestamp": 1493746492.0000,
"value": [10]
"type": rr,
"timestamp": 1493746493.0000,
"value": [1, 2, 3 . . . ]

In this prototype, the Signal Processing Server software computes real-time state indicators from raw sensor values. State indicators are high level features that describe the user's state. They are aligned with the contextual control dimensions as defined by the control map. In this prototype, there are two indicators, the Focus indicator and Restoration indicator. This service is implemented in Python™ and subscribes to the Processing API.

In this prototype, aggregated mean is sufficient to detect changes if the range of activity is limited. For example, where the user remains sitting and performs certain tasks that require mental attention but little movement, the aggregated mean sensor readings may accurately compute the focus and restoration indicators. However, the prototype software is set up to easily replace the mean values method with a quantiles or histogram type representation, which take into account the probability distribution.

In this prototype, in a first step, all incoming sensor data are added to an associated User Model. Each human user has several User Models, one for each sensor feature, such as RR, Respiration Rate, and Neutral Facial Expression. In this prototype, a P-squared algorithm is employed to construct the models. The P-squared algorithm is a heuristic method that dynamically calculates median and quantiles without storing the data. An advantage of the P-squared algorithm is that it requires minimal, fixed data storage. The User Models are loaded when the Signal Processing Server is started.

In this prototype, using these personal models, Z-scores are calculated for the incoming sensor data with $x_{p,f} = (x - \mu_{p,f})/\sigma_{p,f}$, where x is the sensor data point, p is the user's ID, and f is the sensor feature. Accordingly, $\mu_{p,f}$ and $\mu^{p,f}$ are the mean value and standard deviation extracted from the User Model of user p and sensor feature f. The Z-score values are then low pass filtered and combined to a weighted sum to compute the state indicators. If a feature is temporarily not available, then its weight is distributed to the other features.

Figure 12:
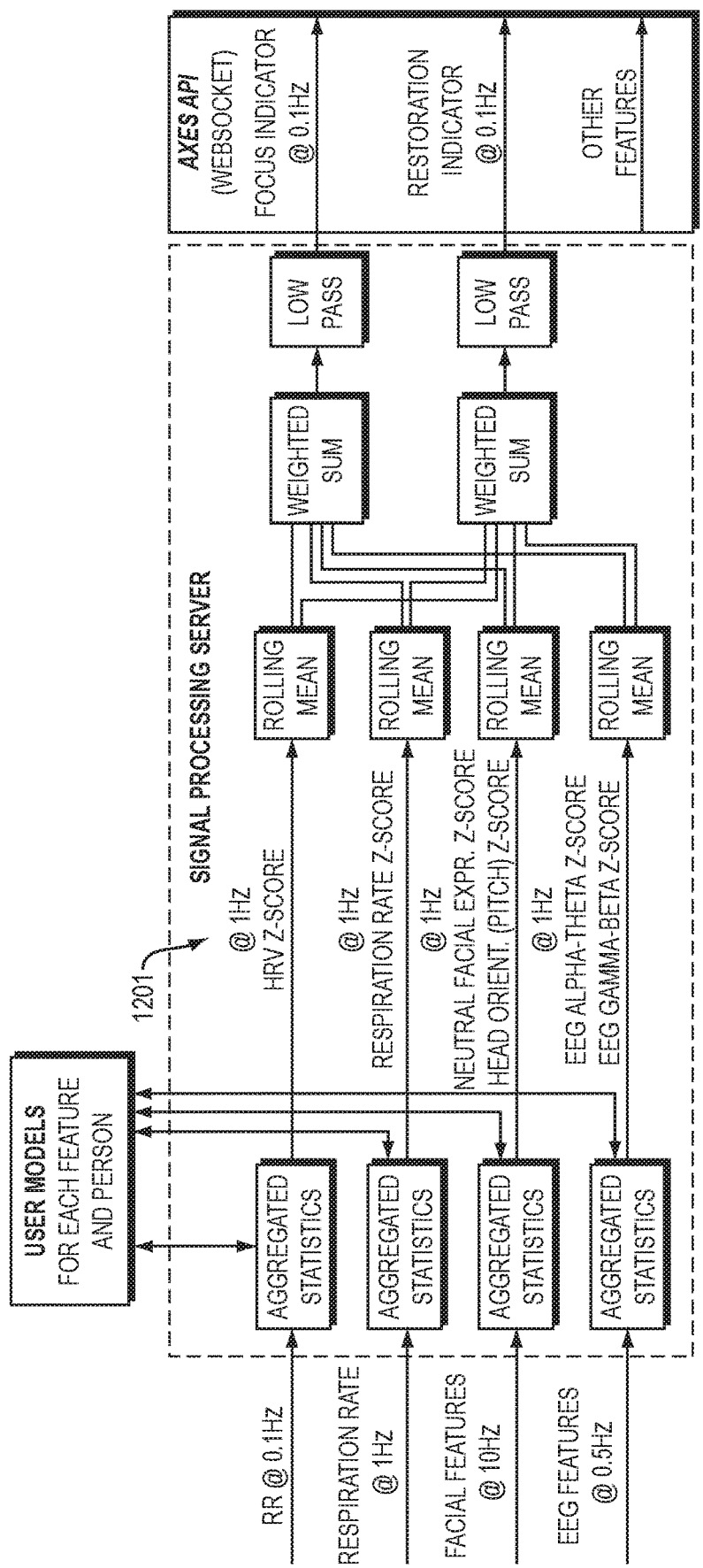
FIG. 12 shows a signal processing server.

FIG. 12 shows a signal processing server, in this prototype. In the example shown in FIG. 12, Z-scores 1201 are processed to calculated state indicators.

Figure 13B:
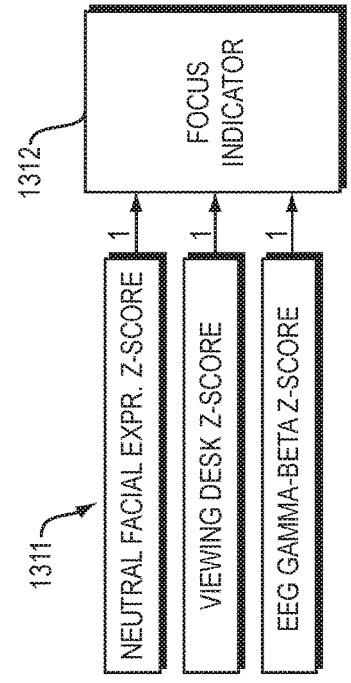
FIG. 13B shows features that are derived from sensor readings and that are employed to determine a focus indicator.
Figure 13A:
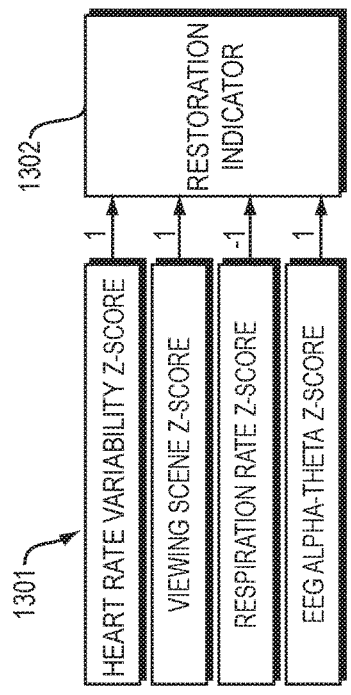
FIG. 13A shows features that are derived from sensor readings and that are employed to determine a restoration indicator.

FIG. 13A shows features 1301 that are derived from sensor readings and that are employed to determine a restoration indicator 1302, in this prototype.

FIG. 13B shows features 1311 that are derived from sensor readings and that are employed to determine a focus indicator 1312, in this prototype.

In this prototype, an Axes API integrates sensing and output capabilities. A subscriber to this API receives regular updates of the Focus and Restoration indicators and measures (features) formatted in JSON. The encoding of features is: 0—Focus Indicator, 1—Restoration Indicator, 2—Heart Rate Variability, 3—Viewing Scene, 4—Respiration Rate, 5—Neutral Facial Expression, 6—Viewing Computer, 7—EEG Gamma-Beta, 8—EEG Alpha-Theta. A feature is null when it is currently not available.

In this prototype, a control application determines how the system or the multimedia scene being displayed adapt to the user's changes.

In this prototype, a web-based graphical user interface enables user interaction with the control application. Before the application starts, the user selects her profile. Upon login, the system loads the appropriate Scene Models from the scene library, which contains information about the user's settings and response to each scene.

In this prototype, there is, for each user, one Focus Model and one Restoration Model for each available scene.

In this prototype, for each given scene and user, the Focus Model contains information about the scene's suitability for focus activities and determines its position in the control map along the focus axis. It accumulates observations related to the user's level of focus and produces statistical measures, e.g. the observed mean level of focus, using the P-squared algorithm. The mean value defines the scene's position on the control map.

In this prototype, the Focus Model accumulates observations related to the user's level of focus and produces statistical measures, e.g. the observed mean level of focus, using the P-squared algorithm. The mean value defines the scene's position on the control map.

In this prototype, manual preference input initiates the Focus model. While viewing the scene, the user specifies its suitability for focus by dragging it into the desired position on the control map. This input generates a dummy dataset with k datapoints using a narrow uniform distribution, where the mean is the selected level of focus. The dummy data is then added to an empty model using the P-squared algorithm. The resulting model simulates an ideal case, where the observations are entirely in agreement with the user's prediction or preference. If no additional sensor observations are available, the manual selection determines the position of the scene in the control map. When observations are added, the model slowly shifts towards the actual response. The speed of adaptation depends on the size of the dummy dataset k. In this application, k is designed to reduce the influence of the initial selection by half after 15 minutes.

Likewise, in this prototype, for each given scene and user, the Restoration Model contains information about the scene's suitability for restoration activities and determines its position in the control map along the restoration axis. The Restoration Model operates in the same manner as the Focus Model, except that models focus instead of restoration.

In this prototype, a graphical user interface displays a control map as a two-dimensional graph. In this prototype, the GUI displays the atmospheric scenes and the current state or operating point derived from real-time sensor data. A bar-graph next to the control map displays the features in real-time. Finally, the GUI allows the user to start or stop the application and select scenes manually. In this prototype, the GU is implemented using Javascript® software and the application itself using Python™ software.

In this prototype, there are two modes of closed loop control: (1) Maintain State mode and (2) Goal mode. In the Maintain State mode, the multimedia system may select a scene to help the user remain in the same user state as when she selected the mode. In the Goal mode the user may specify a goal and the system may select the atmospheric scene that is most likely to guide the user towards the target state.

In this prototype, in the Maintain State mode, an update loop searches for the scene that is the closest to the current state or operating point in the control map. It calculates the distance to the operating point to all available scenes using the Scene Models. If the closest scene is not the current scene on display, then the update loop tests whether the new scene is by a margin closer to the operating point than the current scene (e.g., step 1308 in FIG. 13). This constant margin introduces a hysteresis or inertia to prevent instabilities caused by frequent changes. If this margin is achieved, then a request for the new scene is sent to the Scene Control Server.

Figure 13C:
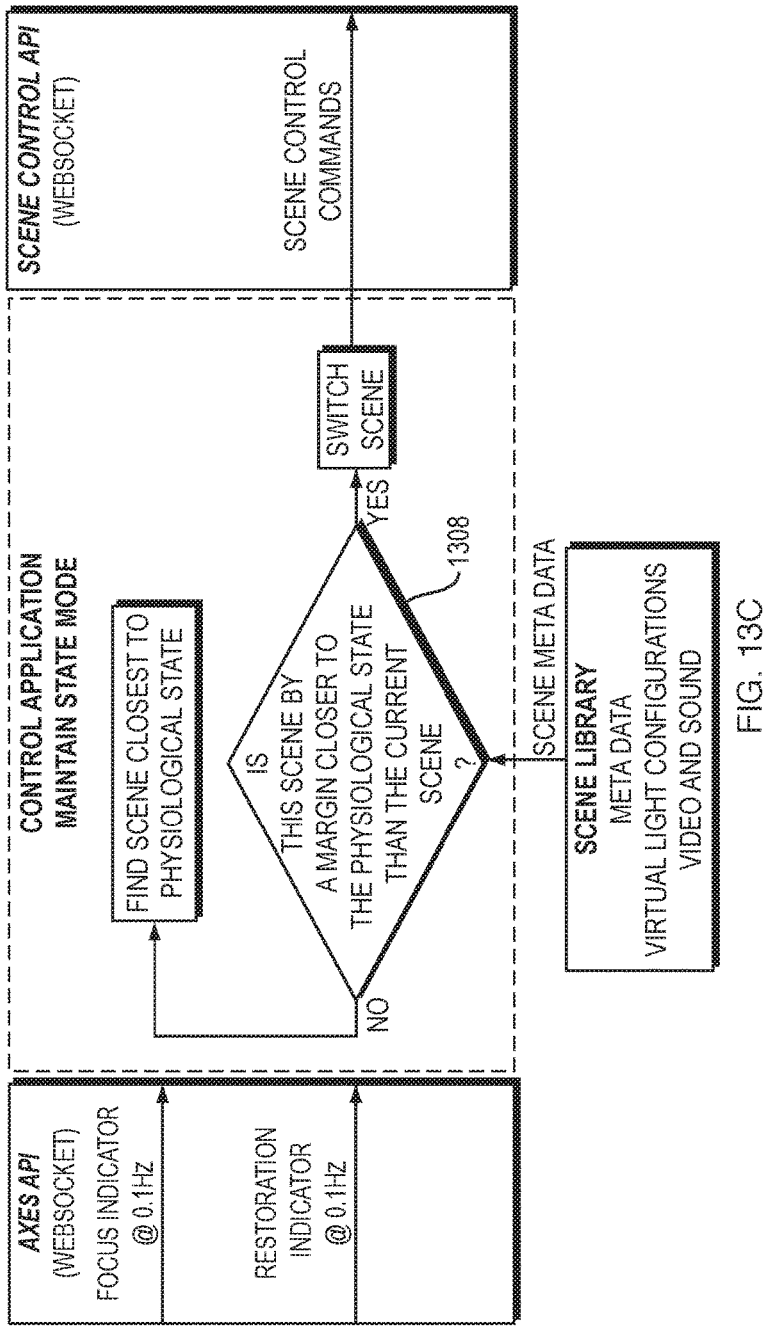
FIG. 13C illustrates a Maintain State mode of closed loop control.

FIG. 13C illustrates a Maintain State mode of closed loop control, in this prototype.

In this prototype, in the Goal mode, a user may select a goal (target) by dragging the goal marker in the focus/restoration control map. The marker may be readjusted at any time. The system then selects the scene that is closest to the goal on the control map (e.g., step 1401 in FIG. 14). During usage, more data is accumulated about the user's response to the selected scene, and the Scene Model updates according to the incoming data. As a result, the position of the scene on the control map relocates. If the scene is contributing to the goal, then the distance between the scene and goal will be decreased. Conversely, if the scene is not contributing to user's goal, the distance between the scene and the goal will increase. Eventually, if the distance becomes large enough, another scene will be selected for the user. This mode also offers a Skip button. This button allows the user to change to another scene that is also beneficial for the user's goal.

Figure 14:
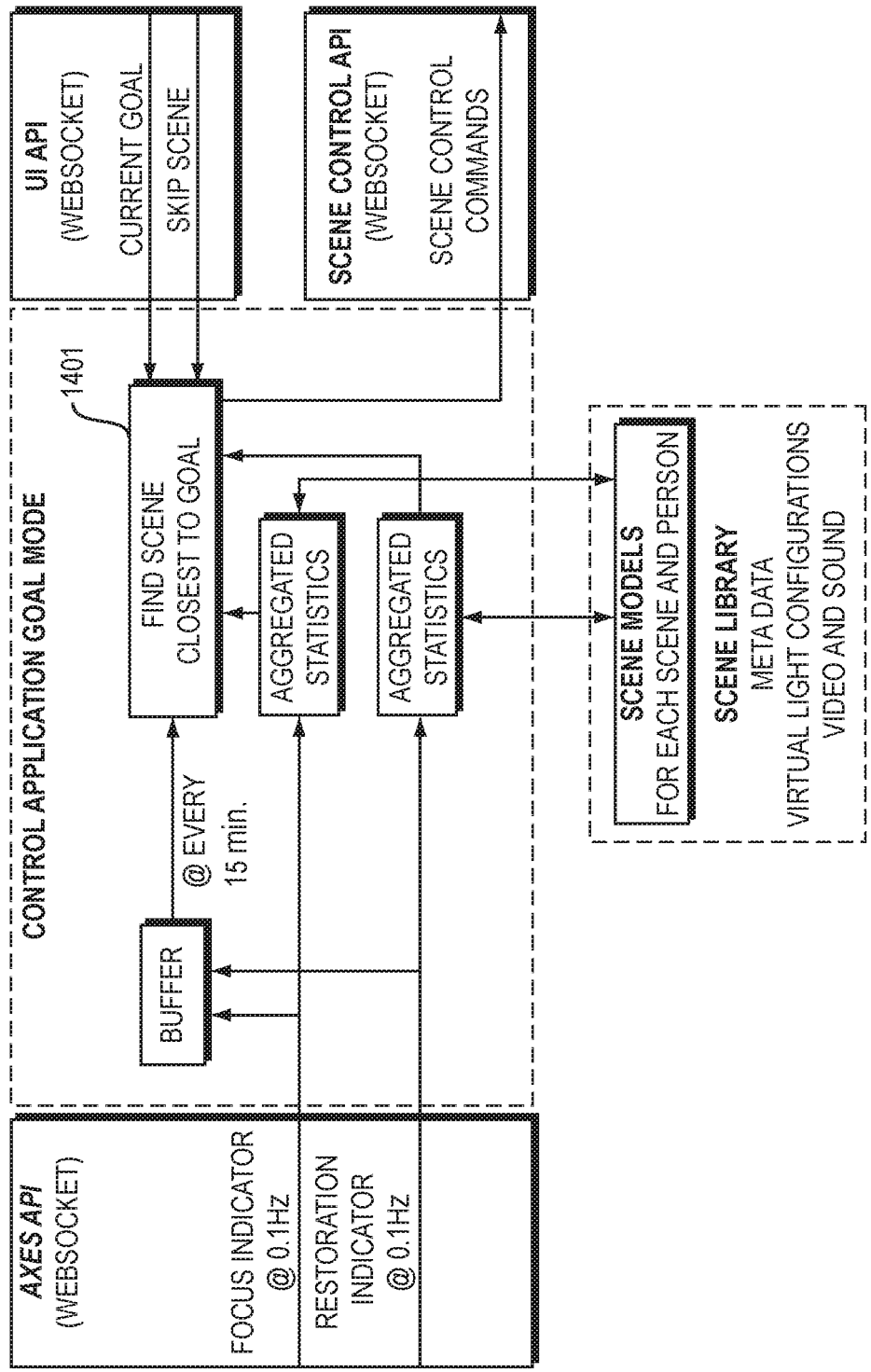
FIG. 14 illustrates a Goal mode of closed loop control.

FIG. 14 illustrates a Goal mode of closed loop control, in this prototype.

The prototype described in the preceding 64 paragraphs is a non-limiting example of this invention. This invention may be implemented in many other ways. For instance, the prototype described in the preceding 64 paragraphs may be modified by adding to the multimedia hardware: (a) one or more scent dispensers for dispensing scents; (b) one or more heaters or cooling devices; and (c) one or more electric fans for moving air (e.g., air that includes scents from the scent dispenser, or heated or cooled air) toward or away from a user. The Scene Control Server may control (in addition to other features, such as video, sound, and room lighting) hardware that produces scents, thermal effects and air movements that are presented to a user during a scene. For instance: (a) during a Library Scene, scent dispensers may dispense a coffee scent, a peppermint scent, or a scent of old books; (b) during a Forest Scene, scent dispensers may dispense a vegetation smell (e.g. pine); (c) during a Christmas scene, scent dispensers may dispense a paraffin scent, or cinnamon scent, or lavender scent; (d) during a Beach scene or Sunset scene, scent dispensers may dispense a water scent, salt water scent, vegetation scent or lavender scent; and (e) during a Neutral Scene, the scent dispensers may dispense no scent. Heaters may provide heat during a Beach scene. A micro-cooling device may output cool air during an Early Morning Mist scene.

Dimensionality Reduction to Create Control Axes

In some implementations, the control axes are—or have been previously—derived, via a dimensionality reduction algorithm, from a higher-dimensional perceptual space. The higher-dimensional perceptual space may comprise data regarding different scenes or regarding users' perceptions of different scenes. These scenes may be multimedia presentations that comprise video, audio, room lighting, scent, thermal stimuli, and air currents and that were outputted by a multimedia system in a room.

For example, in some cases, the dimensionality-reduction algorithm comprises PCA (principal component analysis). In some cases, a computer performs a PCA algorithm to convert data in a high dimensional space (e.g., comprising a dataset of user ratings of scenes) into a set of principal components, in such a way that: (a) the first principal component has the largest possible variance (accounts for as much variability in data as possible); and (b) each succeeding principal component has the highest possible variance under the constraint that it is orthogonal to the preceding components. For instance: (a) the PCA algorithm may be performed with a PSYCH package in the R software environment, employing the Varimax rotation method; (b) the first two rotated principal components outputted by the PCA algorithm may comprise restoration and focus; and (c) restoration and focus may be selected as the dimensions (or axes) of a 2D control space for a multimedia system.

This invention is not limited to PCA. Any dimensionality reduction algorithm method may be employed to initially determine control axes. Or the control axes may be heuristically determined, without a formal algorithm.

Figure 15:
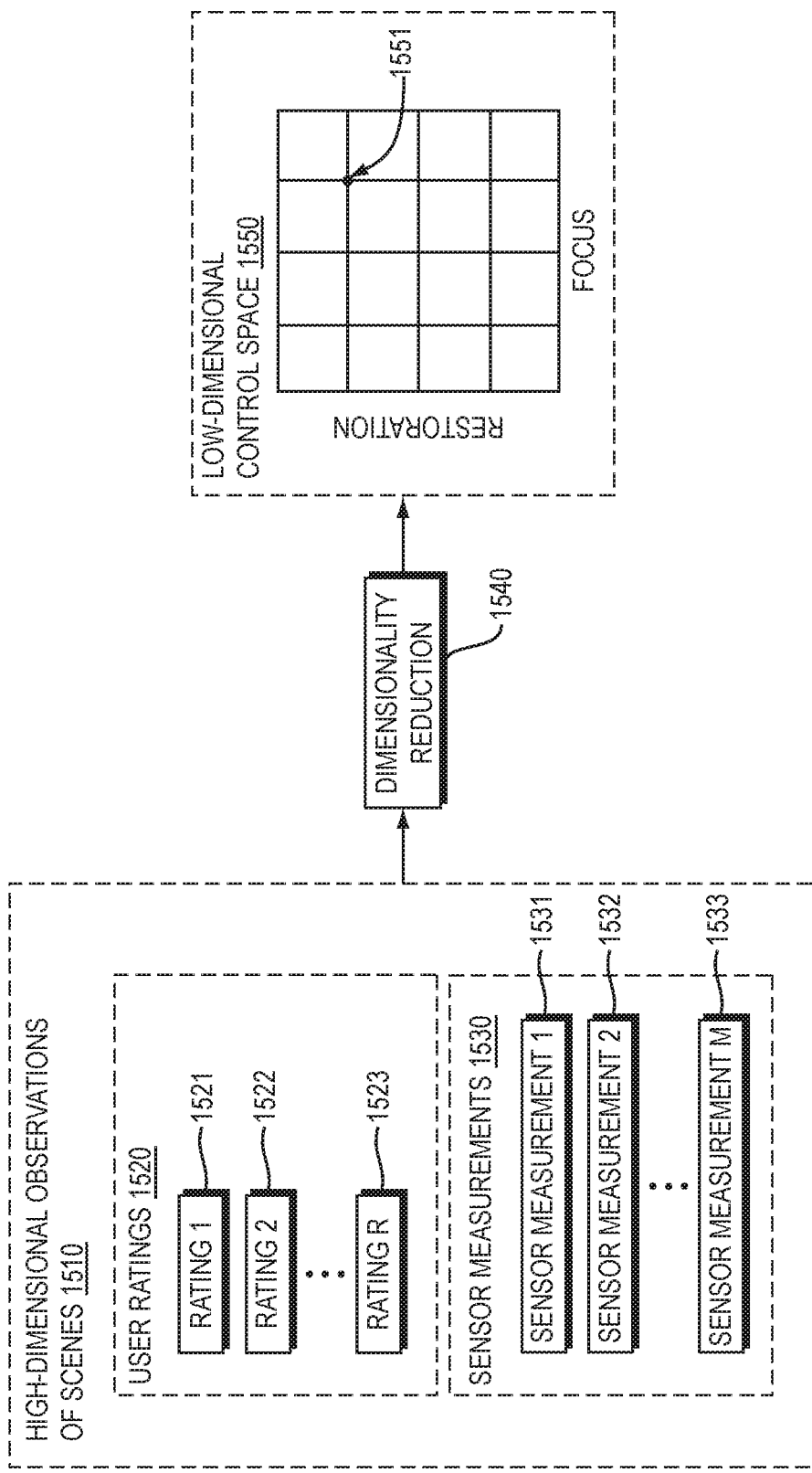
FIG. 15 shows a 2D control space that is derived from higher dimensional observations of scenes.

FIG. 15 shows a 2D control space 1550 that is—or has been—derived from higher dimensional observations of scenes 1510.

In FIG. 15, observations of multiple different scenes are taken (e.g., observations of multiple different scenes that are presented by a multimedia system in a single room at different times). The observations may comprise user ratings 1520 of multiple scenes, including ratings 1521, 1522, 1523. The user ratings may be provided by a group of users who observe the different scenes and fill out answers in a survey to rate the scenes. Alternatively, or in addition, at least a portion of the observations may comprise sensor measurements 1530 of the multiple different scenes, including sensor measurements 1531, 1532, 1533.

In FIG. 15, a computer may perform a dimensionality reduction algorithm 1540 to derive a low-dimensional control space. For example, the dimensionality reduction algorithm may comprise principal component analysis.

In FIG. 15, two axes of a control space are derived from the high dimensional set of observations of scenes. In FIG. 15, these two axes are Restoration and Focus. In FIG. 15, the coordinates of a point (e.g., 1551) in the 2D control space are values on a Restoration axis and Focus axis, respectively.

Software

In the Computer Program Listing above, two computer program files are listed. These two computer program files comprise software employed in a prototype of this invention.

In order to submit these two programs to the U.S. Patent and Trademark Office, the two program files were converted to ASCII .txt format, by making changes to the file extensions. In both of these programs, these changes may be reversed, so that the programs may be run. Specifically, these changes may be reversed by making the following revisions to the file extensions: replacing each "_py.txt" with ".py".

This invention is not limited to the software set forth in these two computer program files. Other software and software instructions may be employed, in illustrative implementations of this invention.

In some implementations of this invention, the computer programs call on files in software libraries or in software distributions. For instance, in some cases, the software calls on one or more programs in one or more of the following libraries or distributions: Anaconda® (a distribution of Python™); Autobahn (a networking library); Livestates (a statistical modeling library), NumPy (a math and data analytics library); Pandas (a data analytics library); Pickle (an object storage library); Pycparser (a parser library); SciPy (a data analytics library); and Twisted (a networking library).

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of a multimedia system, including any luminaire, projector, electronic display screen, touch screen, audio amplifier, speaker, scent dispenser, heater, cooling device, microphone, keyboard, mouse, or other input/output device or transducer; (2) to accept sensor measurements as feedback; (3) to determine a user state, based on sensor measurements, and to associate a user state with coordinates in a control space; (4) to associate settings of the multimedia system (or scenes outputted by the multimedia system) with coordinates in a control space; (5) to accept input specifying a target user state, which target is either a user's current state or a different state, and to cause the multimedia system to adjust its output (e.g., scene presented) to achieve the target; (6) to revise, based on sensor feedback, coordinates in a control space that are assigned to a scene; (7) to perform open loop control or to perform closed loop control; (8) to receive data from, control, or interface with one or more sensors; (9) to perform any other calculation, computation, program, algorithm, or computer function described or implied herein; (10) to receive signals indicative of human input; (11) to output signals for controlling transducers for outputting information in human perceivable format; (12) to process data, to perform computations, and to execute any algorithm or software; and (13) to control the read or write of data to and from memory devices (items 1-13 of this sentence referred to herein as the "Computer Tasks"). The one or more computers (e.g. 190, 415, 425, 1003) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Computer Readable Media

In some implementations, this invention comprises one or more computers that are programmed to perform one or more of the Computer Tasks.

In some implementations, this invention comprises one or more tangible, non-transitory, machine readable media, with instructions encoded thereon for one or more computers to perform one or more of the Computer Tasks.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Network Communication

In illustrative implementations of this invention, multiple electronic devices are each configured for wireless or wired communication with other devices in a network.

For example, in some cases, one or more of these electronic devices each include a wireless module for wireless communication with other devices in a network. Each wireless module (e.g., 191, 414, 424) may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., (e.g. 190, 415, 425, 1003) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

A non-limiting example of "accepting input from" X is accepting input indirectly from X. A non-limiting example of a computer "accepting input from" a user is the computer accepting input from the user via one or more I/O devices that are external to the computer.

Non-limiting examples of "associating" X with Y include: (a) accessing a database that associates X with Y; and (b) accessing a lookup table that associates X with Y.

"At least implicitly" means implicitly or explicitly.

To compute "based on" specified data means to perform a computation that takes the specified data as an input.

Non-limiting examples of a "camera" include: (a) a digital camera; (b) a digital grayscale camera; (c) a digital color camera; (d) a video camera; (e) a light sensor, imaging sensor, or photodetector; (f) a set or array of light sensors, imaging sensors or photodetectors; (h) a light field camera or plenoptic camera; (i) a time-of-flight camera; and (j) a depth camera. In some cases, a camera includes any computers or circuits that process data captured by the camera.

The term "comprise" (and grammatical variations thereof) shall be construed as if followed by "without limitation". If A comprises B, then A includes B and may include other things.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Computer Tasks" is defined above.

A "contextual control axis" means an axis wherein a coordinate on the axis is indicative of a degree to which a scene facilitates or is perceived to facilitate a user state or of a degree to which the user state occurs.

A "contextual control space" means a control space that has contextual control axes.

A "control axis" means a dimension of a control space.

A "control space" means a space, in the mathematical sense.

Distance between "coordinates" of X and "coordinates" of Y means the distance between the point specified by the coordinates of X and the point specified by the coordinates of Y.

"Defined Term" means a term or phrase that is set forth in quotation marks in this Definitions section.

As used herein, the term "display" is not limited to visual stimuli. A non-limiting example of "displaying" stimuli to a user includes presenting the user with one or more stimuli that are perceptible by the user, including one or more visual stimuli, auditory stimuli, olfactory stimuli, haptic stimuli, thermal stimuli or air current stimuli. Unless the context clearly indicates otherwise, the noun "display" refers to stimuli that are outputted by hardware. In the phrase "display screen", "display" is an adjective that modifies the noun "screen". In the phrase "display panel", "display" is an adjective that modifies the noun "panel". In the phrase "liquid crystal display", "display" is hardware.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

A non-limiting example of a scene "facilitating" a specific user state is the scene helping a user to attain the specific user state. Another non-limiting example of a scene "facilitating" a specific user state is the scene causing or inducing (or tending to cause or induce) the specific user state.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

The noun "focus" means a state in which attention is focused.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"I/O device" means an input/output device. Non-limiting examples of an I/O device include a touch screen, other electronic display screen, keyboard, mouse, microphone, handheld electronic game controller, digital stylus, display screen, speaker, or projector for projecting a visual display.

"Observations" of a scene means data regarding human perceptions of the scene or regarding measurements of the scene by one or more sensors.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

As used herein, "scene" means stimuli that comprise a multimedia display.

As used herein, "sensor" does not include a human.

As used herein, the term "set" does not include a group with no elements.

Unless the context clearly indicates otherwise, "some" means one or more.

As used herein, the noun "speaker" does not include a human.

A non-limiting example of "specifying" coordinates is explicitly or implicitly specifying the coordinates. Another non-limiting example of "specifying" coordinates is explicitly or implicitly specifying information from which the coordinates are extractable. To say that input "specifies" that coordinates of X are coordinates of Y means that the input implicitly or explicitly assigns the coordinates of Y to the coordinates of X.

A non-limiting example of a "stored scene" is data that: (a) represents the content of the scene; and (b) is stored in a memory device.

As used herein, a "subset" of a set consists of less than all of the elements of the set.

The term "such as" means for example.

To say that a machine-readable medium is "transitory" means that the medium is a transitory signal, such as an electromagnetic wave.

A "user state" means a state of a user.

In the phrase "user state of the user when the input is accepted", the last five words of the phrase (i.e., "when the input is accepted") modify the first four words of the phrase (i.e., "user state of the user").

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) selecting, from a set of stored scenes, a first scene that has coordinates in a contextual control space that are closer to target coordinates than are those of each other scene in the set; and (b) displaying the first scene to a human user; wherein the first scene, when displayed, includes (i) olfactory stimuli, (ii) audio stimuli, (iii) video stimuli, and (iv) lighting that illuminates a table or desk. In some cases, the first scene is displayed while the table or desk is less than one meter from a point in the user's body. In some cases, the displaying the first scene also includes heating with infrared light. In some cases, the displaying the first scene also includes blowing air to create an air current that reaches and is perceptible to the user. In some cases, the method further comprises: (a) while the first scene is being displayed, taking sensor measurements that measure a response of the user to the first scene; (b) determining, based on the sensor measurements, that a second scene in the set of stored scenes has coordinates in the contextual control space that are closer to the target coordinates than are those of each scene in the set other than the second scene; and (c) transitioning from displaying the first scene to displaying the second scene; wherein the second scene, when displayed, includes audio and video stimuli that are different than the audio and video stimuli in the first scene. In some cases, the second scene, when displayed, includes olfactory stimuli that are different than the olfactory stimuli in the first scene. In some cases, the target coordinates are coordinates, in the contextual control space, that are inputted by the user before the selecting. In some cases, the target coordinates are coordinates, in the contextual control space, that are associated with a physiological state of the user, which state exists when the user inputs an instruction to maintain the state. In some cases, the method further comprises: (a) while the first scene is being displayed, taking sensor measurements that measure a response of the user to the first scene; and (b) revising the coordinates of the first scene, based on the sensor measurements of the response. Each of the cases described above in this paragraph is an example of the method described in the first sentence of this paragraph, and is also an example of an embodiment of this invention that may be combined with other embodiments of this invention.

In some implementations, this invention is a system comprising: (a) one or more scent dispensers; (b) one or more electric fans; (c) one or more heaters; (d) an electronic display screen and one or more speakers; (e) luminaires other than the electronic display screen and other than the one or more heaters; (f) one or more computers; and (g) a table or desk; wherein (i) the one or more computers are programmed (A) to select, from a set of stored scenes, a first scene that has coordinates in a contextual control space that are closer to target coordinates than are those of each other scene in the set, and (B) to output a first set of instructions to display the first scene, and (ii) the system is configured to display, in response to the first set of instructions, the first scene to a human user in such a way that the first scene, when displayed, includes (A) olfactory stimuli produced by the one or more scent dispensers, (B) audio stimuli produced by the one or more speakers, (C) video stimuli displayed by the screen, (D) infrared radiation produced by the one or more heaters, (E) lighting that illuminates the table or desk and that is emitted by the one or more luminaires, and (F) movement of air that is actuated by the one or more fans. In some cases, the table or desk houses, or supports weight of, at least: (a) the one or more scent dispensers; and (b) the electronic display screen. In some cases: (a) the system also includes sensors that are configured to take sensor measurements that measure a response of the human user to the first scene; (b) the one or more computers are programmed (i) to make a determination, based on the sensor measurements, that a second scene in the set of stored scenes has coordinates in the contextual control space that are closer to the target coordinates than are those of each scene in the set other than the second scene, and (ii) based on the determination, to output a second set of instructions to transition from displaying the first scene to displaying the second scene; and (c) the system is configured to display, in response to the second set of instructions, the second scene to the user in such a way that the second scene, when displayed, includes audio and video stimuli that are different than the audio and video stimuli in the first scene. In some cases, the one or more computers are programmed to accept, as input from the user, the target coordinates before selecting the first scene. In some cases, the target coordinates are coordinates, in the contextual control space, that are associated with a physiological state of the user, which state exists when the user inputs an instruction to maintain the state. In some cases: (a) the system also includes sensors that are configured to take sensor measurements that measure a response of the human user to the first scene; and (b) the one or more computers are programmed to revise the coordinates of the first scene, based on the sensor measurements of the response of the user to the first scene. Each of the cases described above in this paragraph is an example of the system described in the first sentence of this paragraph, and is also an example of an embodiment of this invention that may be combined with other embodiments of this invention.

In some implementations, this invention is a system comprising: (a) one or more scent dispensers; (b) an electronic display screen; (c) luminaires other than the electronic display screen; (d) one or more speakers; (e) one or more computers; and (f) a table or desk; wherein (i) the one or more computers are programmed (A) to select, from a set of stored scenes, a first scene that has coordinates in a contextual control space that are closer to target coordinates than are those of each other scene in the set, and (B) to output a first set of instructions to display the first scene, and (ii) the system is configured to display, in response to the first set of instructions, the first scene to a human user in such a way that the first scene, when displayed, includes (A) olfactory stimuli produced by the one or more scent dispensers, (B) audio stimuli produced by the one or more speakers, (C) video stimuli displayed by the screen, and (D) lighting that illuminates the table or desk and that is emitted by the one or more luminaires. In some cases: (a) the system also includes sensors that are configured to take sensor measurements that measure a response of the human user to the first scene; (b) the one or more computers are programmed (i) to make a determination, based on the sensor measurements, that a second scene in the set of stored scenes has coordinates in the contextual control space that are closer to the target coordinates than are those of each scene in the set other than the second scene, and (ii) based on the determination, to output a second set of instructions to transition from displaying the first scene to displaying the second scene; and (c) the system is configured to display, in response to the second set of instructions, the second scene to the user in such a way that the second scene, when displayed, includes audio and video stimuli that are different than the audio and video stimuli in the first scene. In some cases, the one or more computers are programmed to accept, as input from the user, the target coordinates before selecting the first scene. In some cases, the target coordinates are coordinates, in the contextual control space, that are associated with a physiological state of the user, which state exists when the user inputs an instruction to maintain the state. In some cases: (a) the system also includes sensors that are configured to take sensor measurements that measure a response of the human user to the first scene; and (b) the one or more computers are programmed to revise the coordinates of the first scene, based on the sensor measurements of the response of the user to the first scene. Each of the cases described above in this paragraph is an example of the system described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including hardware, hardware components, methods, processes, steps, software, algorithms, features, or technology) that are described herein.

What is claimed:

1. A method comprising:
    (a) selecting, from a set of stored scenes, a first scene that has coordinates in a contextual control space that are closer to target coordinates than are those of each other scene in the set; and
    (b) displaying the first scene to a human user;
    wherein the first scene, when displayed, includes (i) olfactory stimuli, (ii) audio stimuli, (iii) video stimuli, and (iv) lighting that illuminates a table or desk.

2. The method of claim 1, wherein the first scene is displayed while the table or desk is less than one meter from a point in the user's body.

3. The method of claim 1, wherein the displaying the first scene also includes heating with infrared light.

4. The method of claim 1, wherein the displaying the first scene also includes blowing air to create an air current that reaches and is perceptible to the user.

5. The method of claim 1, wherein the method further comprises:
    (a) while the first scene is being displayed, taking sensor measurements that measure a response of the user to the first scene;
    (b) determining, based on the sensor measurements, that a second scene in the set of stored scenes has coordinates in the contextual control space that are closer to the target coordinates than are those of each scene in the set other than the second scene; and
    (c) transitioning from displaying the first scene to displaying the second scene;
    wherein the second scene, when displayed, includes audio and video stimuli that are different than the audio and video stimuli in the first scene.

6. The method of claim 5, wherein the second scene, when displayed, includes olfactory stimuli that are different than the olfactory stimuli in the first scene.

7. The method of claim 1, wherein the target coordinates are coordinates, in the contextual control space, that are inputted by the user before the selecting.

8. The method of claim 1, wherein the target coordinates are coordinates, in the contextual control space, that are associated with a physiological state of the user, which state exists when the user inputs an instruction to maintain the state.

9. The method of claim 1, wherein the method further comprises:
    (a) while the first scene is being displayed, taking sensor measurements that measure a response of the user to the first scene; and
    (b) revising the coordinates of the first scene, based on the sensor measurements of the response.

10. A system comprising:
    (a) one or more scent dispensers;
    (b) one or more electric fans;
    (c) one or more heaters;
    (d) an electronic display screen and one or more speakers;
    (e) luminaires other than the electronic display screen and other than the one or more heaters;
    (f) one or more computers; and
    (g) a table or desk;
    wherein
        (i) the one or more computers are programmed
            (A) to select, from a set of stored scenes, a first scene that has coordinates in a contextual control space that are closer to target coordinates than are those of each other scene in the set, and
            (B) to output a first set of instructions to display the first scene, and
        (ii) the system is configured to display, in response to the first set of instructions, the first scene to a human user in such a way that the first scene, when displayed, includes (A) olfactory stimuli produced by the one or more scent dispensers, (B) audio stimuli produced by the one or more speakers, (C) video stimuli displayed by the screen, (D) infrared radiation produced by the one or more heaters, (E) lighting that illuminates the table or desk and that is emitted by the one or more luminaires, and (F) movement of air that is actuated by the one or more fans.

11. The system of claim 10, wherein the table or desk houses, or supports weight of, at least:
(a) the one or more scent dispensers; and
(b) the electronic display screen.

12. The system of claim 10, wherein:
(a) the system also includes sensors that are configured to take sensor measurements that measure a response of the human user to the first scene;
(b) the one or more computers are programmed
  (i) to make a determination, based on the sensor measurements, that a second scene in the set of stored scenes has coordinates in the contextual control space that are closer to the target coordinates than are those of each scene in the set other than the second scene, and
  (ii) based on the determination, to output a second set of instructions to transition from displaying the first scene to displaying the second scene; and
(c) the system is configured to display, in response to the second set of instructions, the second scene to the user in such a way that the second scene, when displayed, includes audio and video stimuli that are different than the audio and video stimuli in the first scene.

13. The system of claim 10, wherein the one or more computers are programmed to accept, as input from the user, the target coordinates before selecting the first scene.

14. The system of claim 10, wherein the target coordinates are coordinates, in the contextual control space, that are associated with a physiological state of the user, which state exists when the user inputs an instruction to maintain the state.

15. The system of claim 10, wherein:
(a) the system also includes sensors that are configured to take sensor measurements that measure a response of the human user to the first scene; and
(b) the one or more computers are programmed to revise the coordinates of the first scene, based on the sensor measurements of the response of the user to the first scene.

16. A system comprising:
(a) one or more scent dispensers;
(b) an electronic display screen;
(c) luminaires other than the electronic display screen;
(d) one or more speakers;
(e) one or more computers; and
(f) a table or desk;

wherein
(i) the one or more computers are programmed
  (A) to select, from a set of stored scenes, a first scene that has coordinates in a contextual control space that are closer to target coordinates than are those of each other scene in the set, and
  (B) to output a first set of instructions to display the first scene, and
(ii) the system is configured to display, in response to the first set of instructions, the first scene to a human user in such a way that the first scene, when displayed, includes (A) olfactory stimuli produced by the one or more scent dispensers, (B) audio stimuli produced by the one or more speakers, (C) video stimuli displayed by the screen, and (D) lighting that illuminates the table or desk and that is emitted by the one or more luminaires.

17. The system of claim 16, wherein:
(a) the system also includes sensors that are configured to take sensor measurements that measure a response of the human user to the first scene;
(b) the one or more computers are programmed
  (i) to make a determination, based on the sensor measurements, that a second scene in the set of stored scenes has coordinates in the contextual control space that are closer to the target coordinates than are those of each scene in the set other than the second scene, and
  (ii) based on the determination, to output a second set of instructions to transition from displaying the first scene to displaying the second scene; and
(c) the system is configured to display, in response to the second set of instructions, the second scene to the user in such a way that the second scene, when displayed, includes audio and video stimuli that are different than the audio and video stimuli in the first scene.

18. The system of claim 16, wherein the one or more computers are programmed to accept, as input from the user, the target coordinates before selecting the first scene.

19. The system of claim 16, wherein the target coordinates are coordinates, in the contextual control space, that are associated with a physiological state of the user, which state exists when the user inputs an instruction to maintain the state.

20. The system of claim 16, wherein:
(a) the system also includes sensors that are configured to take sensor measurements that measure a response of the human user to the first scene; and
(b) the one or more computers are programmed to revise the coordinates of the first scene, based on the sensor measurements of the response of the user to the first scene.

* * * * *